(12) United States Patent
Haghighi et al.

(10) Patent No.: US 10,131,570 B2
(45) Date of Patent: Nov. 20, 2018

(54) LIQUID-BASED MASKING LAYER

(71) Applicants: Behzad Haghighi, Shiraz (IR);
Mojtaba Karimikargar, Tabriz (IR)

(72) Inventors: Behzad Haghighi, Shiraz (IR);
Mojtaba Karimikargar, Tabriz (IR)

( * ) Notice: Subject to any disclaimer, the term of this patent is extended or adjusted under 35 U.S.C. 154(b) by 0 days.

(21) Appl. No.: 15/784,155

(22) Filed: Oct. 15, 2017

(65) Prior Publication Data
US 2018/0037494 A1    Feb. 8, 2018

Related U.S. Application Data

(60) Provisional application No. 62/408,703, filed on Oct. 15, 2016.

(51) Int. Cl.
| | | |
|---|---|---|
| *C03C 15/00* | (2006.01) | |
| *C23F 1/00* | (2006.01) | |
| *B44C 1/22* | (2006.01) | |
| *C23F 1/02* | (2006.01) | |

(52) U.S. Cl.
CPC .............. *C03C 15/00* (2013.01); *C23F 1/00* (2013.01); *C23F 1/02* (2013.01); *C03C 2218/34* (2013.01); *H05K 999/99* (2013.01)

(58) Field of Classification Search
None
See application file for complete search history.

(56) References Cited

U.S. PATENT DOCUMENTS

| | | | | |
|---|---|---|---|---|
| 6,027,630 | A * | 2/2000 | Cohen ................ | B81C 1/00126 205/118 |
| 2014/0290732 | A1 | 10/2014 | Aizenberg et al. | |
| 2015/0175814 | A1 | 6/2015 | Aizenberg et al. | |
| 2015/0209846 | A1 | 7/2015 | Aizanberg et al. | |
| 2015/0210951 | A1 | 7/2015 | Aizenberg et al. | |
| 2016/0002272 | A1* | 1/2016 | Wu ....................... | A61K 9/0051 424/427 |
| 2017/0154767 | A1* | 6/2017 | Mischitz ........... | H01L 21/02203 |

OTHER PUBLICATIONS

Tingting Song, Fabrication of super slippery sheet-layered and porous anodic aluminium oxide surfaces and its anticorrosion property, Applied Surface Science, Jun. 2015, vol. 355, pp. 495-501.

(Continued)

*Primary Examiner* — Shamim Ahmed
(74) *Attorney, Agent, or Firm* — Bajwa IP Law Firm; Haris Zaheer Bajwa

(57) ABSTRACT

A method of fabricating a liquid-based masking layer for a wet etching process, is disclosed. The method comprises forming a coated solid substrate by coating a solid substrate with a coating; forming a preliminary masking layer by removing parts of the coating which are not included in a pattern; depositing a porous surface on the preliminary mask to obtain a porous preliminary mask; forming a liquid-based masking layer by filling the pores of the porous preliminary mask with a filling liquid; and applying an etchant to a surface of the solid substrate and the liquid-based masking layer, etching parts of the substrate that are not covered with the liquid-based masking layer.

18 Claims, 32 Drawing Sheets

(56) References Cited

OTHER PUBLICATIONS

Alexander B. Tesler, Extremely durable biofouling-resistant metallic surfaces based on electrodeposited nanoporous tungstite films on steel, nature communications, Jun. 2015, 6:8649 doi: 10.1038/ncomms9649 (2015).

Ri Qiu, Fabrication of slippery liquid-infused porous surface based on carbon fiber with enhanced corrosion inhibition property, Colloids and Surfaces A: Physicochemical and Engineering Aspects, Jan. 2014, vol. 453, pp. 132-141.

Shengsheng Yang, Slippery liquid-infused porous surface based on perfluorinated lubricant/iron tetradecanoate: Preparation and corrosion protection application, Applied Surface Science, Jun. 2014, vol. 328, pp. 491-500.

Peng Wang, Slippery liquid-infused porous surfaces fabricated on aluminum as a barrier to corrosion induced by sulfate reducing bacteria, Corrosion Science, Oct. 2014, vol. 93, pp. 159-166.

Yugang Sun, Direct Growth of Dense, Pristine Metal Nanoplates with Well-Controlled Dimensions on Semiconductor Substrates, Chemistry of Materials, Aug. 2007, vol. 19, pp. 5845-5847.

Yongchao Lai, Silver nanoplates prepared by modified galvanic displacement for surface-enhanced Raman spectroscopy, Nanoscale, Dec. 2010, Issue 5, pp. 2134-2137.

\* cited by examiner

LIQUID-BASED MASKING LAYER

CROSS-REFERENCE TO RELATED APPLICATION

This application claims the benefit of priority from U.S. Provisional Patent Application Ser. No. 62/408,703, filed on Oct. 15, 2016, and entitled "LIQUID-BASED MASKING LAYER," which is incorporated herein by reference in its entirety.

TECHNICAL FIELD

The present disclosure generally relates to masking layers and particularly relates to masking layers that may be used in wet etching processes, and more particularly relates to liquid-based masking layers that may be used in wet etching processes.

BACKGROUND

Etching is a process of chemically removing layers from a surface of a solid substrate using an etchant, such as an acid or a mordant. In an etching process, parts of the solid substrate can be protected from etching by a masking material which resists etching and is hereinafter referred to as the "masking layer". Any pattern can be made on the surface of a substrate by etching and using a suitable masking layer. To this end, the solid substrate can be a single block of materials, such as a glass sheet or a thin film coated on a base substrate such as a thin film of silver coated on a glass, and the masking layer may cover the entire surface of the substrate except the parts which must be etched. To obtain desirable results from the etching, the masking layer need to adhere to the surface of the substrate; not to be detached easily from the surface of the substrate; and not to react with the etchant.

Masking layers such as photo-resist layers and vapor-phase deposited layers have been known and used in the art. The afore-mentioned masking layers, may be associated with issues such as only being deposited on clean substrates and in clean environments. In this method, the existence of any foreign material on the surface may alter the adhesion of the masking layer to the surface of the substrate. Furthermore, thin masking layers may easily detach from the substrate, if the substrate is subjected to bending or deformation, during or after the etching process, which may limit the minimum thickness of the masking layer. On the other hand, the masking layer cannot be deposited on non-flat surfaces which may limit the applications of the conventional etching methods to flat surfaces and, prohibit the usage of the etching method inside enclosed passages or 3D substrates. From another point of view, masking layers known in the art may need to undergo thermal procedures to solidify, and obtain suitable hydrophobicity and decrease residual stress. Therefore, the methods known in the art may be associated with time and cost issues, and there is a need in the art for a simple and low-cost masking layer.

SUMMARY

This summary is intended to provide an overview of the subject matter of the present disclosure, and is not intended to identify essential elements or key elements of the subject matter, nor is it intended to be used to determine the scope of the claimed embodiments. The proper scope of the present disclosure may be ascertained from the claims set forth below in view of the detailed description below and the drawings.

In one general aspect, the present disclosure is directed to a method of fabricating a liquid-based masking layer for a wet etching process. The method may include the steps of forming a coated solid substrate by coating a solid substrate with a coating; forming a preliminary masking layer by removing parts of the coating which are not included in a pattern; depositing a porous surface on the preliminary mask to obtain a porous preliminary mask; forming a liquid-based masking layer by filling the pores of the porous preliminary mask with a filling liquid; and applying an etchant to a surface of the solid substrate and the liquid-based masking layer, etching parts of the substrate that are not covered with the liquid-based masking layer.

In an exemplary embodiment, applying the etchant to the surface of the solid substrate may include applying the etchant to a top surface of the solid substrate on which the liquid-based masking layer is formed. In an exemplary embodiment, forming the coated solid substrate by coating a solid substrate with a coating may include coating all exposed surfaces of the solid substrate with the coating. In an exemplary embodiment, forming a preliminary masking layer by removing parts of the coating which are not included in the pattern, may include removing parts of the coating not included in the pattern, by drop casting an acid selectively on parts of the coated solid substrate. In an exemplary embodiment, applying an etchant to the solid substrate etching parts of the substrate that are not covered with the liquid-based masking layer may include applying the etchant by dipping the solid substrate with the liquid-based masking layer into an etchant. In an exemplary embodiment, forming a liquid-based masking layer by filling the pores of the patterned porous surface with a filling liquid may further include hydrophilizing the patterned porous surface. In an exemplary embodiment, the liquid-based masking layer may be resistant to the etchant used for the wet etching process. In an exemplary embodiment, depositing a porous surface on the preliminary mask to obtain a porous preliminary mask; may further include depositing a porous surface with magnetic properties on the preliminary mask to obtain a magnetic porous preliminary mask. In another general aspect, the present disclosure is directed to a method of fabricating a liquid-based masking layer used for wet etching process. The method may include the steps of forming a porous preliminary mask on a solid substrate by depositing a porous surface on parts of the solid substrate not included in a pattern; forming a liquid-based masking layer by filling the pores of the porous preliminary mask with a filling liquid; and applying an etchant to a surface of the solid substrate etching parts of the substrate that are not covered with the liquid-based masking layer.

In an exemplary embodiment, applying an etchant to the solid substrate may include applying an etchant to a top surface of the solid substrate on which the liquid-based masking layer is formed. In an exemplary embodiment, applying an etchant to the solid substrate, etching parts of the substrate that are not covered with the liquid-based masking layer may include, applying the etchant by dipping the solid substrate with the liquid-based masking layer into the etchant. In an exemplary embodiment, forming a liquid-based masking layer by filling the pores of the porous preliminary mask with a filling liquid may further include hydrophilizing the porous preliminary mask. In an exemplary embodiment, the liquid-based masking layer may be resistant to the etchant used for the wet etching process. In an exemplary embodiment, forming a porous preliminary mask on a surface of the solid substrate, may further include forming a porous preliminary mask using a microfluidic chip. In an exemplary embodiment, forming a porous preliminary mask using a microfluidic chip may further include the steps of forming a patterned microfluidic chip by engraving a pattern on the microfluidic chip; placing the microfluidic chip on the solid substrate and filling the pattern engraved on the microfluidic chip with a carrier liquid; and forming a porous preliminary mask on the solid substrate by drying the carrier liquid and obtaining a porous surface. In an exemplary embodiment, forming a porous preliminary mask on a surface of the solid substrate, may further include forming a porous preliminary mask using a nozzle. In an exemplary embodiment, forming a porous preliminary mask using a nozzle may further include the steps of placing the nozzle on the surface of the solid substrate according to a pattern; injecting a carrier liquid on the solid substrate; and forming a porous preliminary mask on the solid substrate by drying the carrier liquid. In an exemplary embodiment, forming a porous preliminary mask on a solid substrate by depositing a porous surface on the solid substrate, may further include forming a porous preliminary mask with magnetic properties on a solid substrate by depositing a porous surface on the solid substrate.

BRIEF DESCRIPTION OF THE DRAWINGS

The drawing figures depict one or more exemplary embodiments in accord with the present teachings, by way of example only, not by way of limitation. In the figures, like reference numerals refer to the same or similar elements.

DETAILED DESCRIPTION

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary embodiments will be readily apparent to one skilled in the art, and the general principles defined herein may be applied to other embodiments and applications without departing from the scope of the present disclosure. The present disclosure is not intended to be limited to the embodiments shown, but is to be accorded the widest possible scope consistent with the principles and features disclosed herein.

Etching is a process of chemically removing layers from a surface of a solid substrate using an etchant, such as an acid or a mordant. In a general aspect etching may be used to make patterns on a solid substrate. To this end, parts of the solid substrate may be protected from etching by a masking material which resists etching and other parts of the solid substrate which are required to be etched, are not covered with the masking layer, therefore a pattern may be prepared on the solid substrate by etching some parts of the substrate and protecting other parts of the substrate from etching.

Figure 1A:
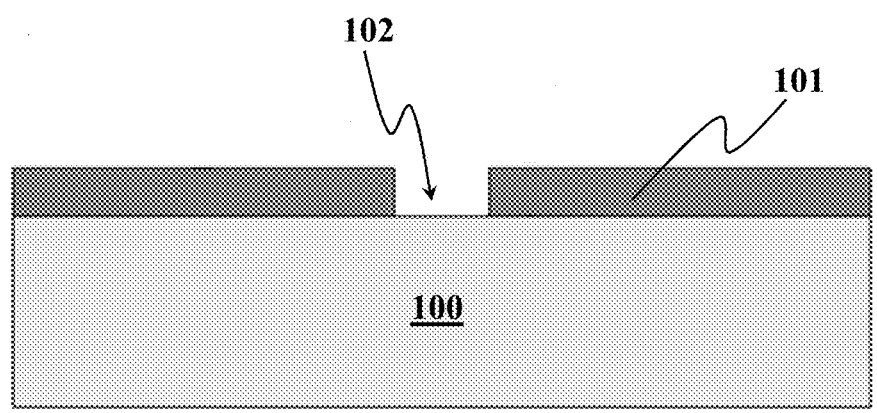
FIG. 1A shows a schematic of a surface prepared for etching, before the etching process as known in the art.
Figure 1B:
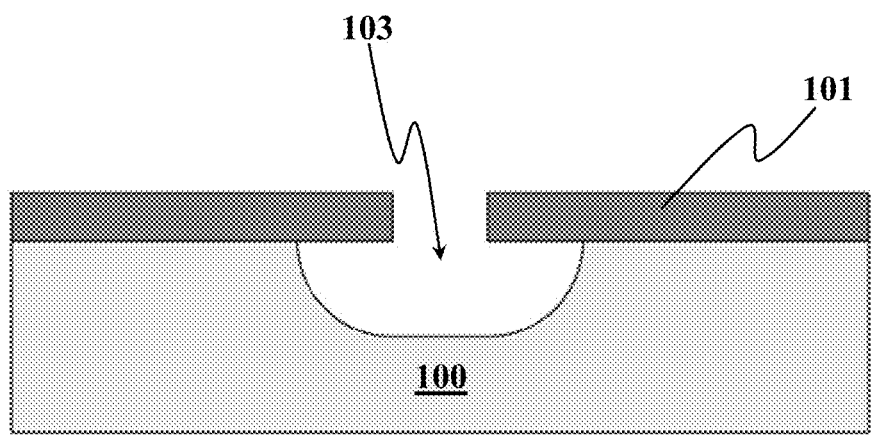
FIG. 1B shows a schematic of a surface prepared for etching, after the etching process as known in the art.

FIG. 1A shows a schematic of a surface prepared for etching, before the etching process as known in the art, and FIG. 1B shows a schematic of a surface prepared for etching, after the etching process as known in the art. Referring to FIGS. 1A and 1B, in an etching process, parts of the solid substrate 100 may be protected from etching by a masking material 101 which resists etching and is hereinafter referred to as the "masking layer" and other parts of the solid substrate which are required to be etched 102 are not protected by the masking layer. By applying the etchant on the solid substrates, parts of the solid substrate which are not covered with the masking layer are etched 103, while the parts covered with the masking layer remain protected. In an exemplary embodiment, the solid substrate can be a single block of material such as a glass sheet or a thin film coated on a base substrate such as a thin film of silver coated on a glass, and the masking layer may cover the entire surface of the substrate except the parts which must be etched 102. The present disclosure is directed to a method for fabricating a cheap, simple and reusable liquid-based masking layer. In different embodiments, this liquid-based masking layer includes provisions to protect some parts of the substrate from etching, during wet etching process.

Figure 2:
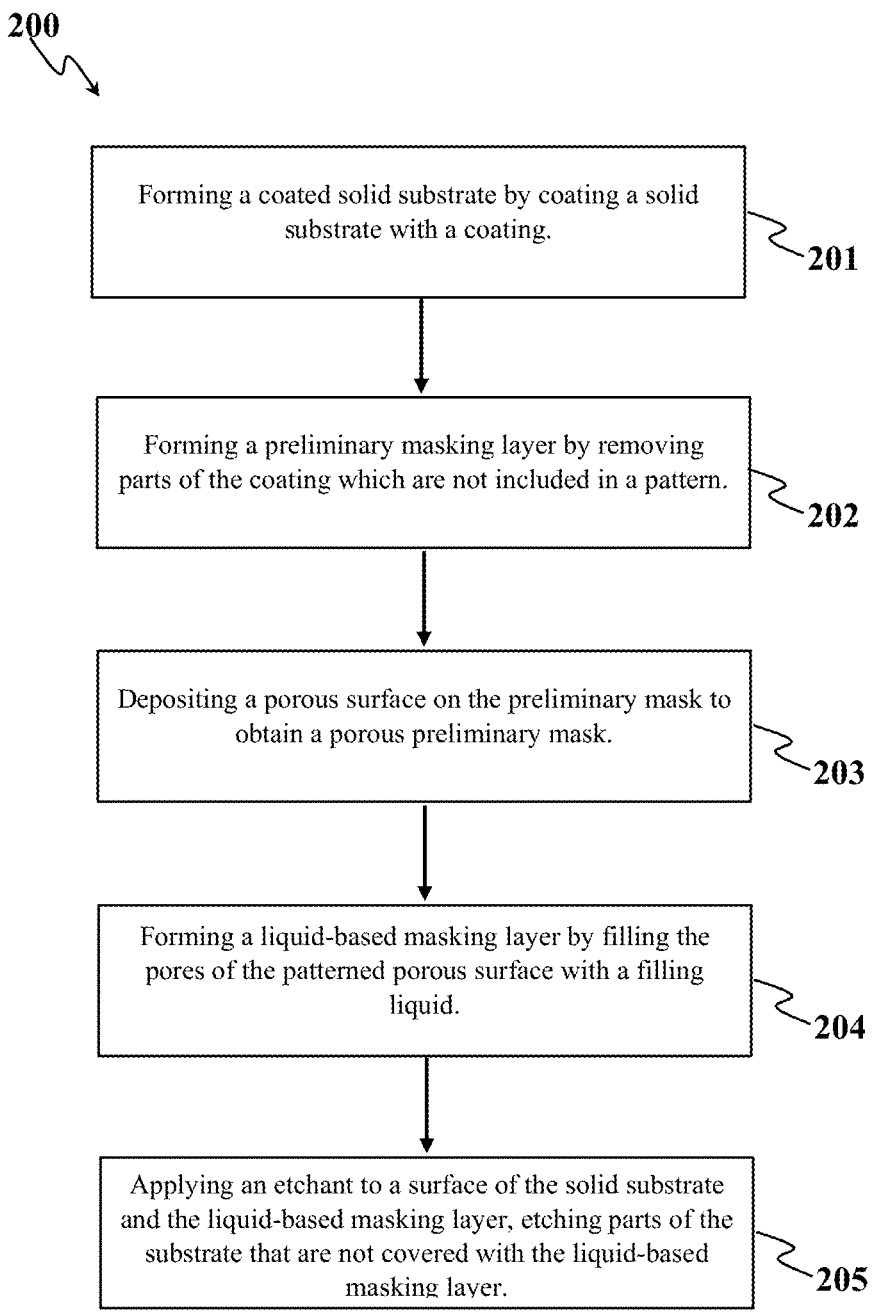
FIG. 2 illustrates a method of fabricating a liquid-based masking layer, consistent with one or more exemplary embodiments of the present disclosure.
Figure 6A:
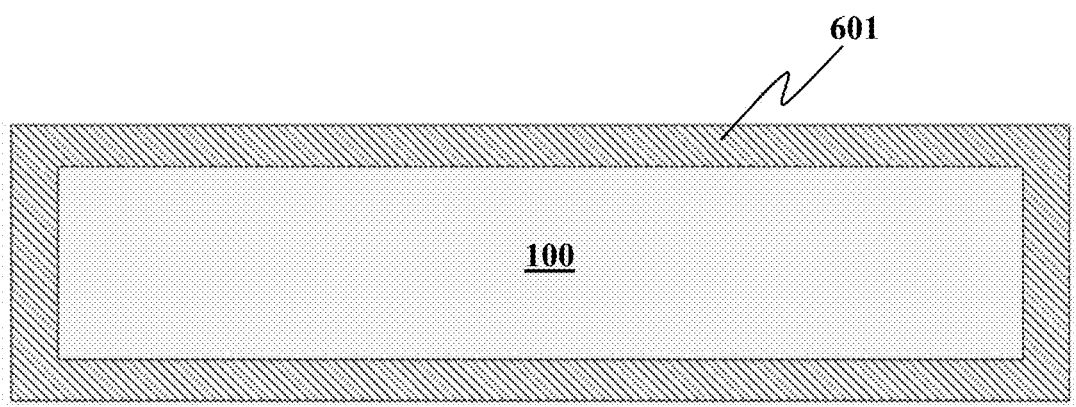
FIG. 6A illustrates a schematic of a solid substrate coated with a preliminary masking layer consistent with one or more exemplary embodiments of the present disclosure.
Figure 6B:
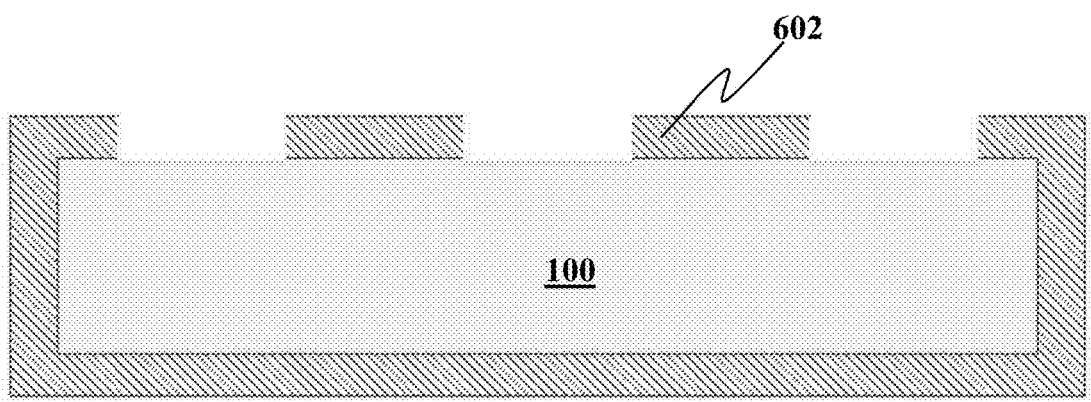
FIG. 6B illustrates a schematic of a solid substrate coated with a preliminary masking layer after removing the parts not included in the pattern, consistent with one or more exemplary embodiments of the present disclosure.
Figure 6C:
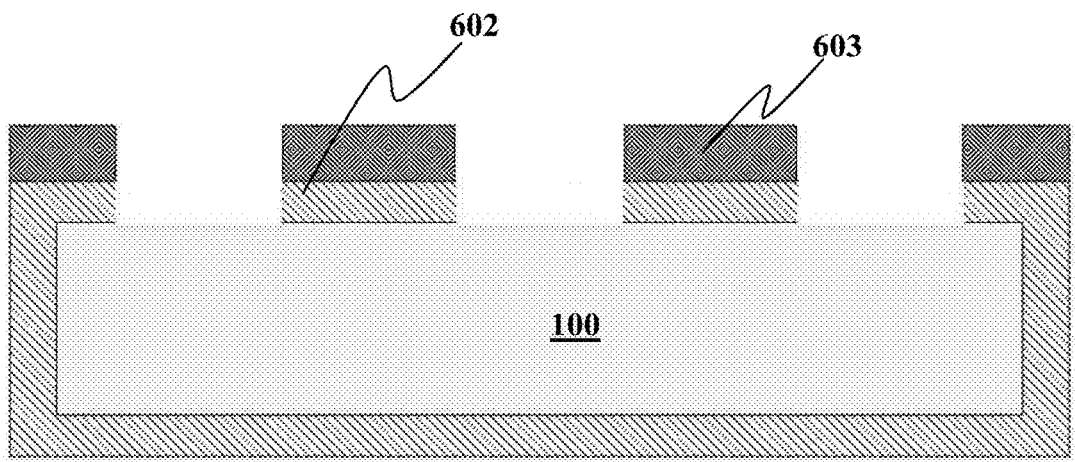
FIG. 6C illustrates a schematic of a liquid-based masking layer consistent with one or more exemplary embodiments of the present disclosure.

For purpose of clarity, FIG. 2 illustrates a method of fabricating a liquid-based masking layer, consistent with one or more exemplary embodiments of the present disclosure. As shown in FIG. 2, in an exemplary embodiment, the method 200, includes a first step 201 of forming a coated solid substrate by coating a solid substrate with a coating, which is shown in FIG. 6A. A second step 202 may involve forming a preliminary masking layer by removing parts of the coating which are not included in a pattern, which is shown in FIG. 6B. In this process, the porous surface may be removed from the parts of the solid substrate which are desired to be etched, and may remain in the parts of the solid substrate which are not desired to be etched. A third step 203 may include depositing a porous surface on the preliminary mask to obtain a porous preliminary mask, which is shown in FIG. 6C. A fourth step 204 may include forming a liquid-based masking layer by filling the pores of the porous preliminary mask with a filling liquid. A fifth step 205, may involve applying an etchant to a surface of the solid substrate and the liquid-based masking layer, etching parts of the substrate that are not covered with the liquid-based masking layer.

The liquid-based masking layer is resistant to the etchant and protects the parts of the substrate covered with the filling liquid from being etched, therefore the parts of the substrate which are not covered with the liquid-based masking layer are etched and the parts of the substrate which are covered with the liquid-based masking layer are protected from etching.

Further details regarding the method of fabrication are provided herein. Referring to step 201, the solid substrate 100 is the substrate which is required to be etched. The solid substrate may be chosen from the group consisting of glass, metals, alloys, metal oxides, silicon wafers, ceramics, graphene, polymers and combinations thereof. Referring to FIG. 6A, according to an exemplary embodiment, a porous surface 601 may be provided on the solid surface using a method selected from the group consisting of dip coating, chemical vapor deposition, physical vapor deposition, spin coating, solution polymerization, layer by layer deposition, spray coating, sol-gel, 3D printing and combinations thereof. In some embodiments, the porous surface may be selected from the group consisting of metals, alloys, metal oxides, polymers, silica and combinations thereof.

Referring to step 203 and FIG. 6C, finally, the pores of the preliminary masking layer 603, may be filled with a filling liquid to obtain a liquid-based masking layer. In an exemplary embodiment, the filling liquid may be a liquid which is immiscible to the solid substrate and the etchant and does not react with the solid substrate and the etchant. By adding the etchant to the substrate, the parts of the substrate which are covered with the liquid-based masking layer are protected from etching and the uncovered parts are etched. Finally, the liquid-based masking layer may be removed from the substrate to obtain a pattern on the substrate.

Figure 5:
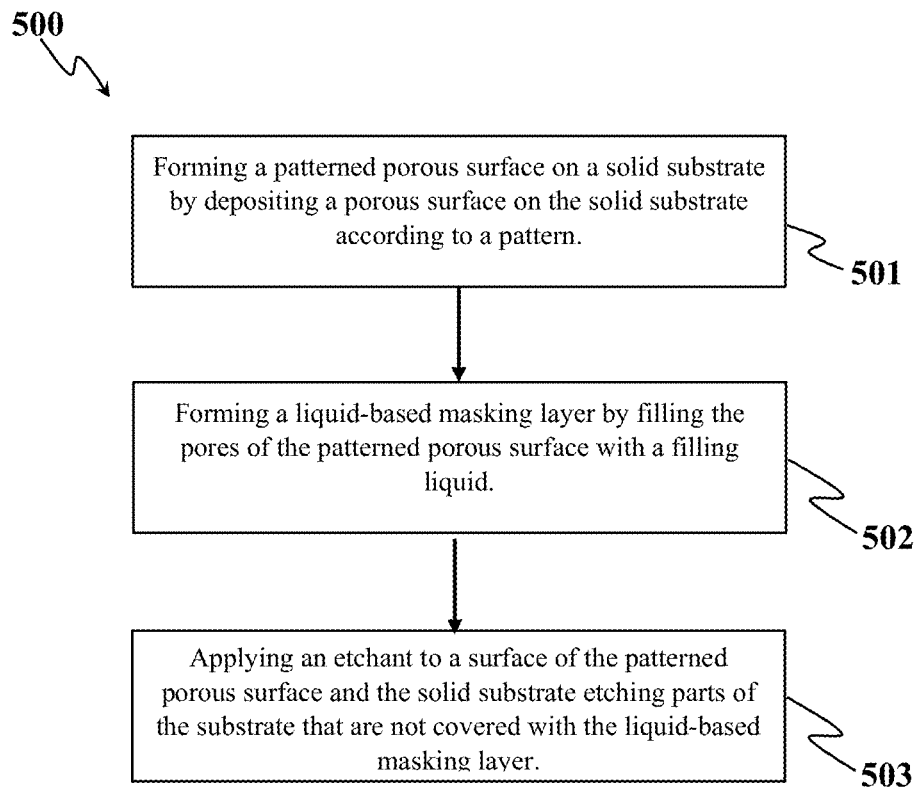
FIG. 5 illustrates a method of coating a glass substrate with a silver layer, consistent with one or more exemplary embodiments of the present disclosure.

FIG. 5 illustrates a method of fabricating a liquid-based masking layer, consistent with one or more exemplary embodiments of the present disclosure. As shown in FIG. 5, in an exemplary embodiment, the method 500, includes a first step 501 of forming a patterned porous surface on a solid substrate by depositing a porous surface on the solid substrate according to a pattern. A second step 502 may include forming a liquid-based masking layer by filling the pores of the patterned porous surface with a filling liquid and a third step 503 may include applying an etchant to a surface of the patterned porous surface and the solid substrate etching parts of the substrate that are not covered with the liquid-based masking layer.

Example 1

For purposes of clarity, one example is provided in which a liquid-based masking layer is fabricated pursuant to the teachings of the present disclosure. However, it should be understood that in other embodiments, one or more of the steps disclosed herein can be omitted as desired, or additional steps may be included. As described above, in an exemplary embodiment, the liquid-based masking layer may include, a substrate which may further include a porous surface; and a filling liquid filling the porous surface of the substrate to provide a stabilized liquid layer on the substrate. The porous surface may help obtaining a substantially stable and immobilized liquid layer on the substrate surface in order to form a liquid-based masking layer.

Figure 3:
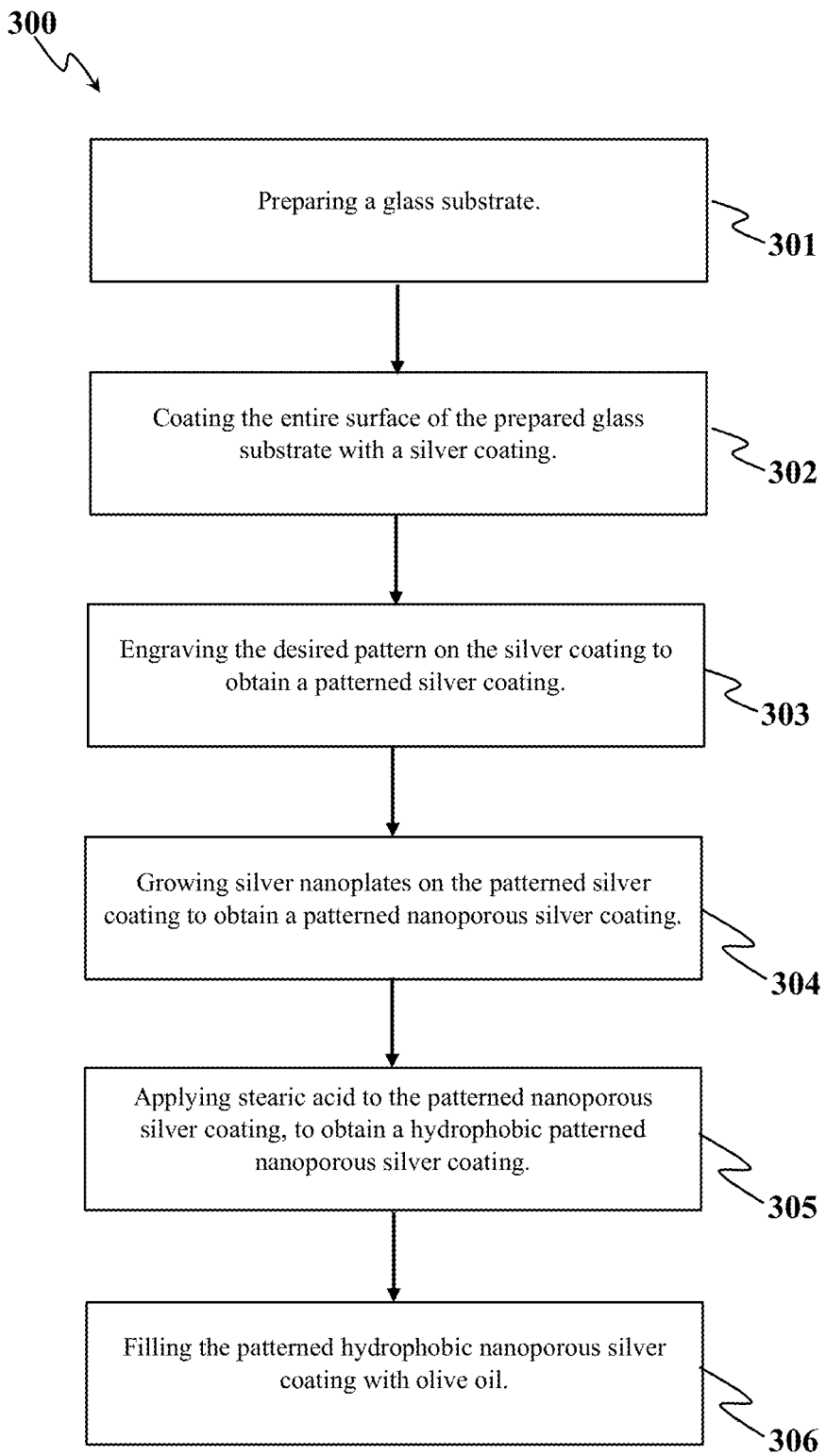
FIG. 3 illustrates a method of fabricating a liquid-based masking layer for wet etching of a glass substrate using hydrogen fluoride, consistent with one or more exemplary embodiments of the present disclosure.
Figure 4:
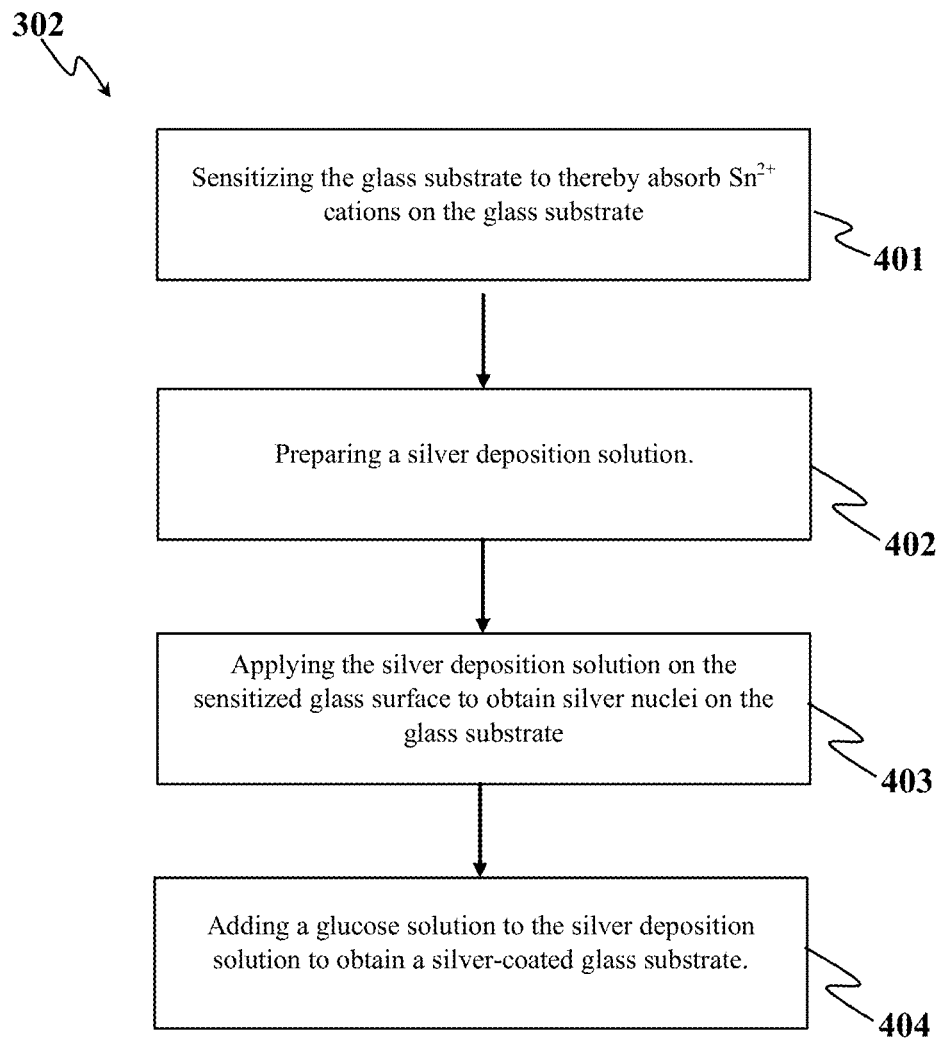
FIG. 4 illustrates a method of coating a glass substrate with a silver layer, consistent with one or more exemplary embodiments of the present disclosure.

In this example, the substrate is a glass substrate which is subjected to etching with hydrogen fluoride. A liquid-based masking layer, is fabricated on specific parts of the glass substrate to prevent etching on these parts, and thereby obtain a pattern on the glass substrate. In this example silver has been chosen as the coating material due to its inertness to hydrogen fluoride. In an example, a nanoporous silver layer may be fabricated on the glass substrate to obtain a porous surface on the glass substrate. FIG. 3 illustrates a method of fabricating a liquid-based masking layer for wet etching of a glass substrate using hydrogen fluoride, consistent with one or more exemplary embodiments of the present disclosure. FIG. 3 is an implementation of the general method shown in FIG. 2, which is applied on a glass substrate. The method 300 for fabricating a liquid-based masking layer to protect parts of a glass substrate from wet etching with hydrogen fluoride, may include a first step 301 of preparing a glass substrate. The second step 302 may include coating the entire surface of the prepared glass surface with a thin silver layer using electroless deposition, and thereby obtaining a silver-coated glass substrate. In this example, steps 301 and 302 describe step 201 in details. In this method, the thickness and uniformity of the silver coating is uncontrollable and different silver layers may differ in residual stress from one substrate to another.

In this example, steps 303, 304, and 305 describe step 202 in details. A third step 303, may include drop-casting a silver etchant on the silver-coated glass substrate to selectively etch the silver coating and thereby obtaining a patterned silver-coated glass substrate. A fourth step 304, may include growing vertically-aligned silver nanoplates on the patterned silver-coated glass substrate, to obtain a nano-porous silver pattern on the glass substrate. To this end, galvanic displacement method may be used. In galvanic displacement method, a copper sheet may be placed as an anode and the patterned silver-coated glass substrate may be placed as a cathode to perform the galvanic displacement process. The growth solution used in the galvanic displacement process may contain a source of silver, such as silver nitrate, and a facet-selective capping agent which promotes silver nanoplate growth on the patterned silver-coated glass substrate, such as citric acid.

The as-prepared nano-porous silver pattern on the glass substrate, has superhydrophilic properties, therefore, by filling the nano-porous silver pattern with the filling liquid, which is olive oil in this example, the filling liquid is repelled from the surface of the nano-porous silver pattern. To overcome the aforementioned issue, superhydrophobic properties need to be provided on the surface of the nano-porous silver pattern. Therefore, a fifth step 305, may include applying stearic acid to convert the as-prepared superhydrophilic nano-porous silver pattern, into a superhydrophobic nano-porous silver pattern. To this end, the superhydrophilic nano-porous silver pattern may be immersed in a stearic acid solution or the stearic acid solution may be drop casted on the surface of the superhydrophilic nano-porous silver pattern, to thereby obtain a superhydrophobic nano-porous silver pattern.

Finally, a sixth step 306, may include applying olive oil on the superhydrophobic nano-porous silver pattern, to obtain a liquid-based masking layer. The paragraphs above briefly described the fabrication method of a liquid-based masking layer. The fabrication method is further described in details.

Referring to step 301, for the purpose of preparing a glass substrate to be coated with a silver coating, commercially available cover glasses (No. 1, 6×2.5 cm$^2$) are used as the glass substrates. The glass substrates are first placed in an ultrasonic bath. A solution of sulfuric acid with a concentration of 98% (w/w) and hydrogen peroxide with a concentration of 30% (w/w), with a final ratio of 3:1 (v/v), was prepared which is herein after referred to as the Piranha solution. The Piranha solution is slowly added to the ultrasonic bath such that the glass substrates are completely immersed in the Piranha solution. Ultrasonic agitation is performed at room temperature in the freshly prepared piranha solution for one hour and then continued for another one hour at 70° C. Then the ultrasonic bath is filled with deionized water and the glass substrates are placed in the ultrasonic bath filled with deionized water and sonicated for 5 minutes, to thereby remove the Piranha solution residues from the glass substrates. For better results, the sonication in the ultrasonic bath filled with deionized water, may be repeated for three times. In the next step, the ultrasonic bath is filled with a 1 Molar Sodium hydroxide solution, and the glass substrates are placed in the ultrasonic bath and sonicated for one hour to thereby provide negative charges on the glass substrate. The negative charges provided on the glass substrate may be further used in the sensitization process to anchor $Sn^{2+}$ cations on the glass substrate. At this point, the ultrasonic bath is filled with deionized water and the glass substrates are placed in the ultrasonic bath filled with deionized water and sonicated for 5 minutes in three consecutive steps, to thereby remove any residues of the sodium hydroxide solution.

Referring to step 302, coating the entire surface of the prepared glass substrate with a silver coating to obtain a silver-coated glass substrate, may include a first step 401 of sensitizing the glass substrates to thereby absorb $Sn^{2+}$ cations on the negatively charged glass substrate prepared in the previous step. A second step 402, may include preparing a silver deposition solution which is further used to coat the glass substrate with a silver coating. A third step 403 of coating the glass substrate with a silver coating, may include, applying the silver deposition solution on the sensitized glass surface to obtain silver nuclei on the glass substrate. A fourth step 404, may include adding a glucose solution to the silver deposition solution to obtain a silver-coated glass substrate.

Referring to step 401, to sensitize the glass substrate, 250 milliliters of a solution containing deionized water, 0.2 grams of $(SnCl_2)_2H_2O$ and 500 microliters of HCl with a weight ratio of 37%, which is hereinafter referred to as the sensitization solution is prepared. The glass substrates are then placed in the sensitization solution for 5 minutes. In this step, $Sn^{2+}$ cations are adsorbed by the negatively charged glass. Referring to step 402, the silver deposition solution used in this example is a Tollens solution. The preparation of Tollens solution includes a step 1 of dissolving 0.34 grams of silver nitrate with a purity of 99.99% in 25 milliliters of deionized water; a step 2 of adding an ammonia solution with a concentration of 25%, w/w in a drop wise manner to the solution. By adding ammonia, the color of the solution turns to dark brown at first, but the addition of ammonia is continued until obtaining a transparent clear solution. Step 3 includes adding 5 milliliters of potassium hydroxide solution with a concentration of 1.6 Molar to the solution of step 2. In step 3, by adding the potassium hydroxide solution, the color of the solution changes to dark black. Finally, step 4, may include adding an ammonia solution in a dropwise manner to the dark black solution obtained in step 3 to obtain a transparent clear solution, which is referred to as the Tollens solution. It should be noted that Tollens solution should be prepared freshly to avoid probable silver azide formation and explosion danger.

Figure 7:
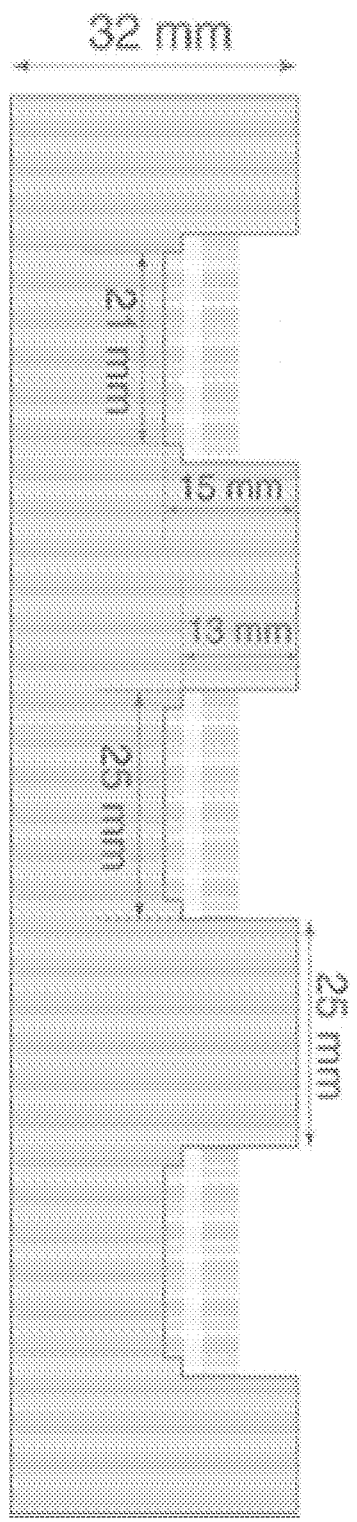
FIG. 7 shows a side-view of an exemplar PTFE block with deposition chambers, consistent with one or more exemplary embodiments of the present disclosure.

Referring to the third step 403, in order to apply a uniform silver coating on the glass substrates, in an exemplary embodiment, the glass substrates may be placed on blocks with deposition chambers, such that the silver deposition solution may freely move under the glass substrate and a uniform coating may be provided on both sides of the glass in a single run. In this example, a PTFE block with three deposition chambers is used. A schematic of an exemplar PTFE block with exemplar dimensions, is shown in FIGS. 6 and 7. In this exemplary PTFE block, each chamber may be loaded with 10 milliliters of the silver deposition solution.

Figure 8:
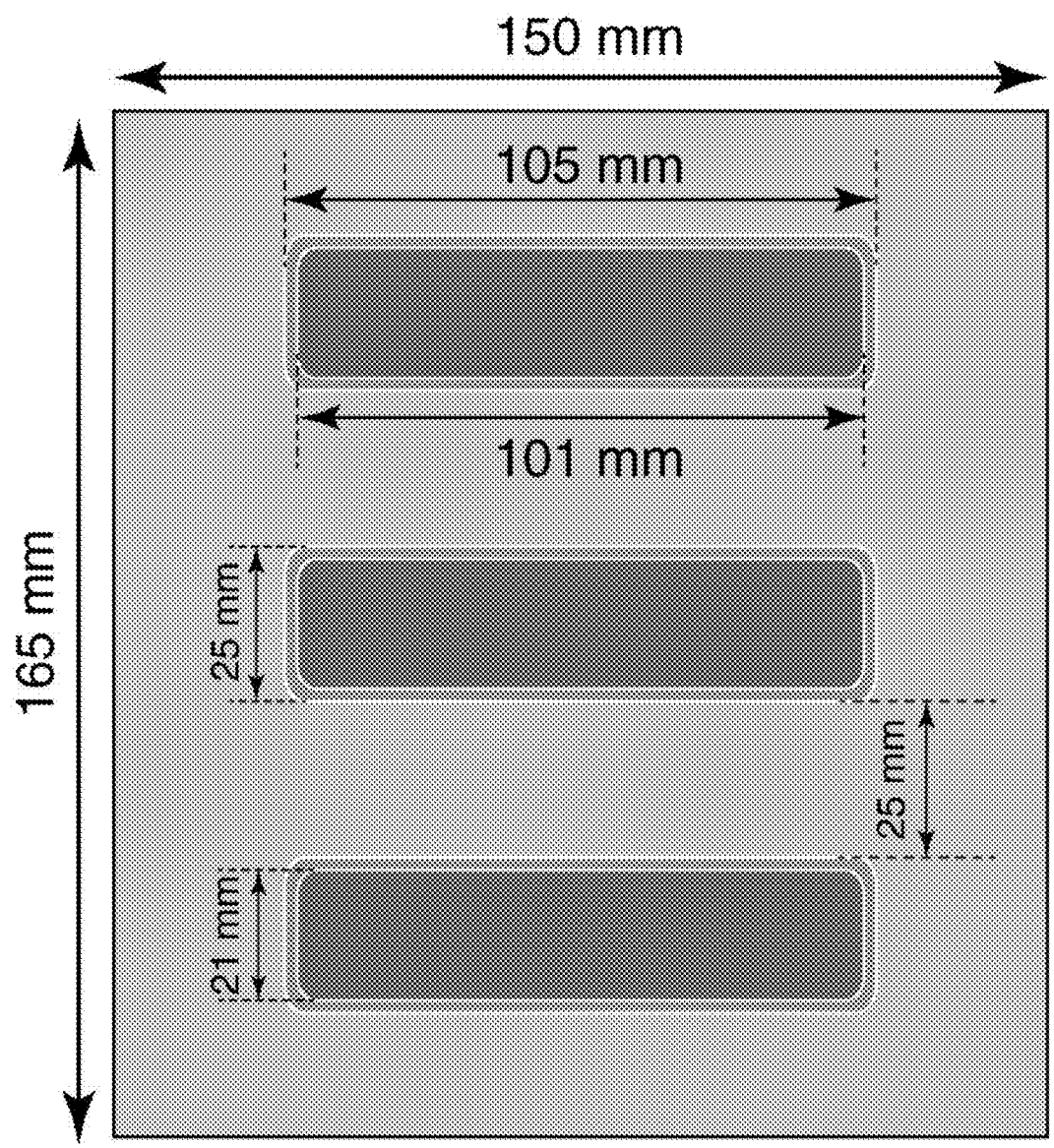
FIG. 8 shows a top-view of an exemplar PTFE block with deposition chambers, consistent with one or more exemplary embodiments of the present disclosure.
Figure 9A:
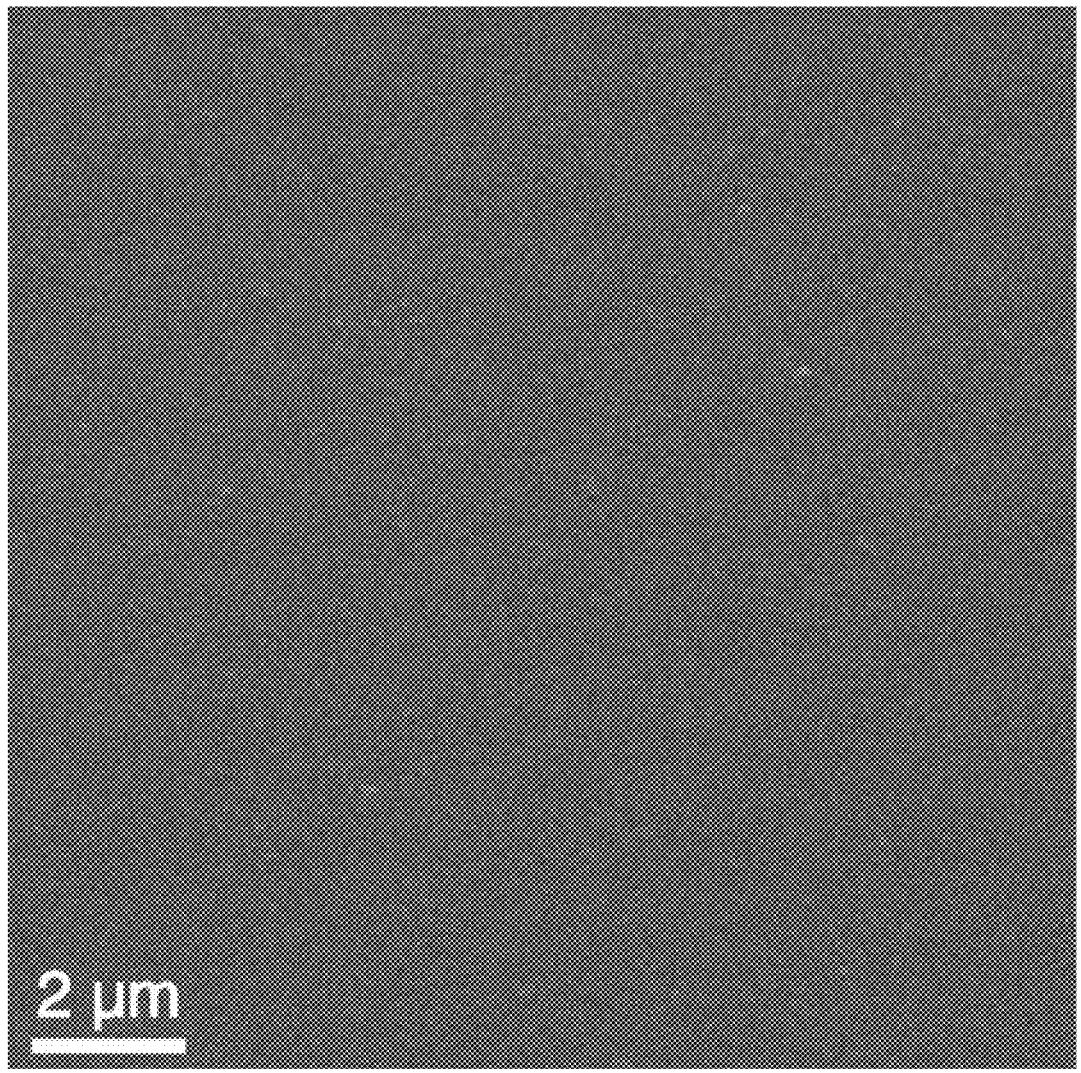
FIG. 9A illustrates an SEM image of a plain glass substrate as a reference.
Figure 9B:
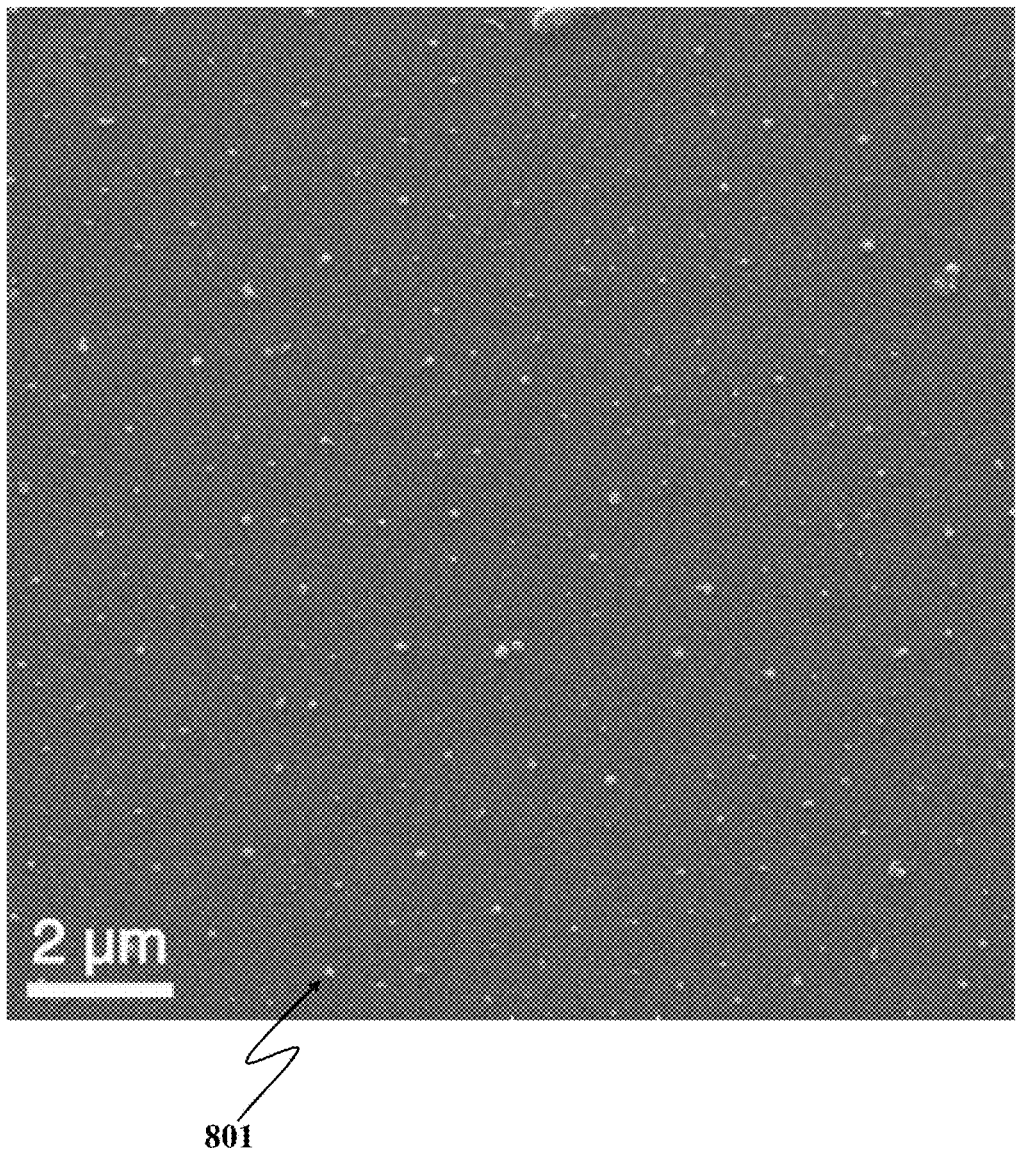
FIG. 9B shows an SEM image of a glass substrate placed in the silver deposition solution, on which silver nanoparticles have grown, consistent with one or more exemplary embodiments of the present disclosure.
Figure 9C:
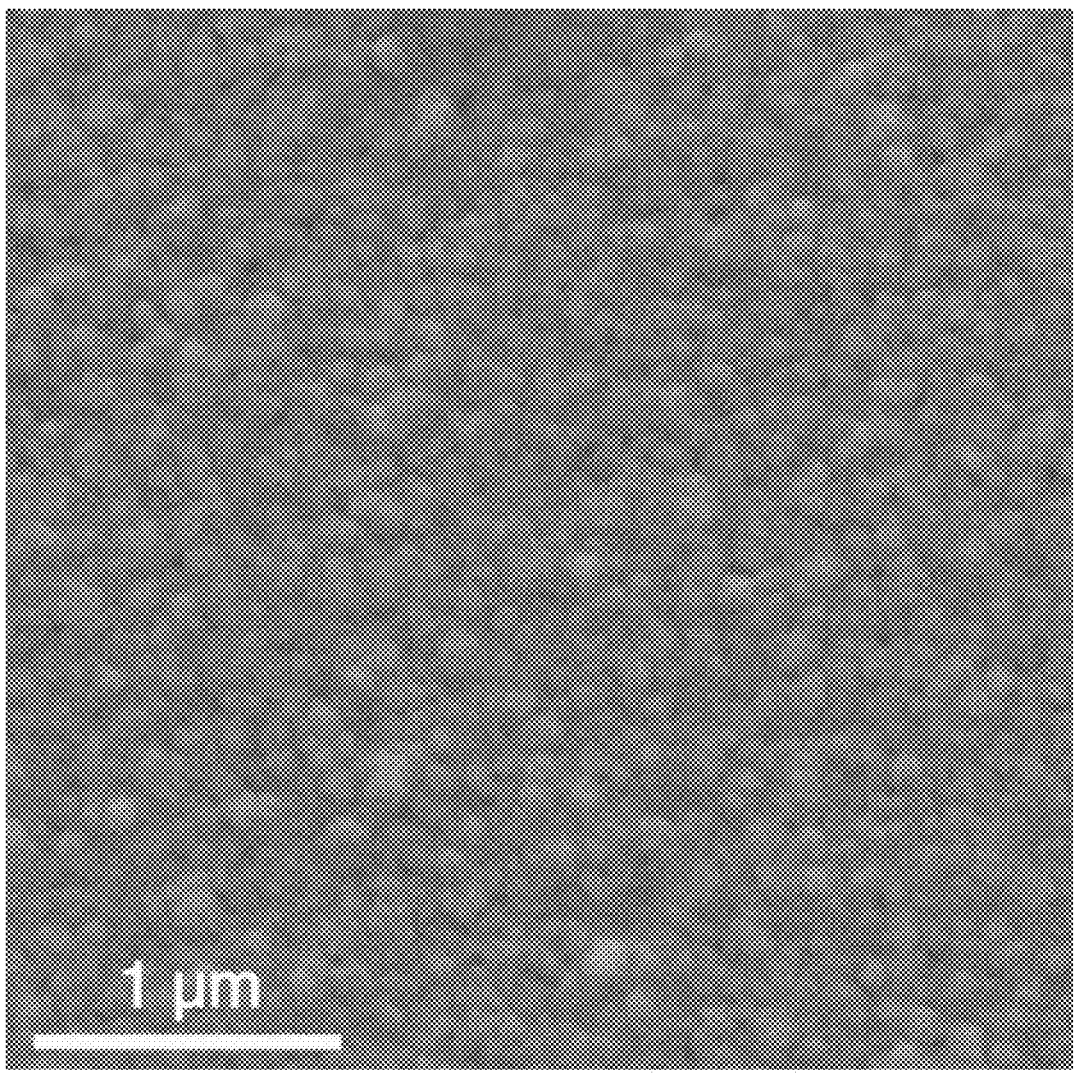
FIG. 9C shows an SEM image of a glass substrate fully covered with a silver nanoparticle coating, consistent with one or more exemplary embodiments of the present disclosure.

The sensitized glass substrate is washed with deionized water and immediately placed horizontally into the chamber of the PTFE block, which is filled with the silver deposition solution, for 1-2 minutes. FIG. 9A shows an SEM image of a plain glass substrate as a reference. FIG. 9B shows an SEM image of a glass substrate placed in the silver deposition solution, on which silver nanoparticles have grown. Referring to FIGS. 8A and 8B, it can be seen that the adsorbed $Sn^{2+}$ cations reduce silver ions to silver nanoparticles 801. The silver nanoparticles 801 act as the nuclei to cover the glass surface with silver, entirely. FIG. 9C shows an SEM image of a glass substrate fully covered with a silver nanoparticle coating. Referring to FIG. 9C, by continuing the reduction process, the entire surface of the glass substrate may be coated with a coating of silver nanoparticles.

Figure 10A:
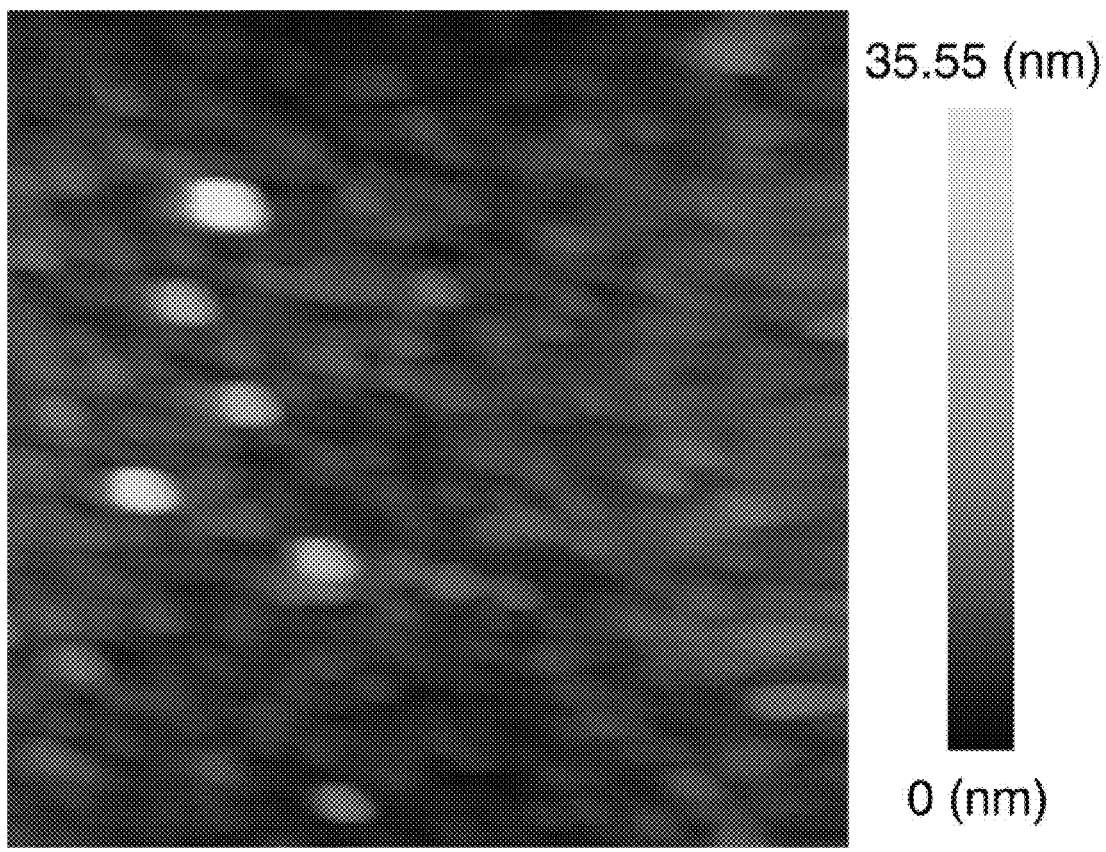
FIG. 10A shows an AFM image of a 4 µm×4 µm primary silver layer coated on glass substrates, consistent with one or more exemplary embodiments of the present disclosure.
Figure 10B:
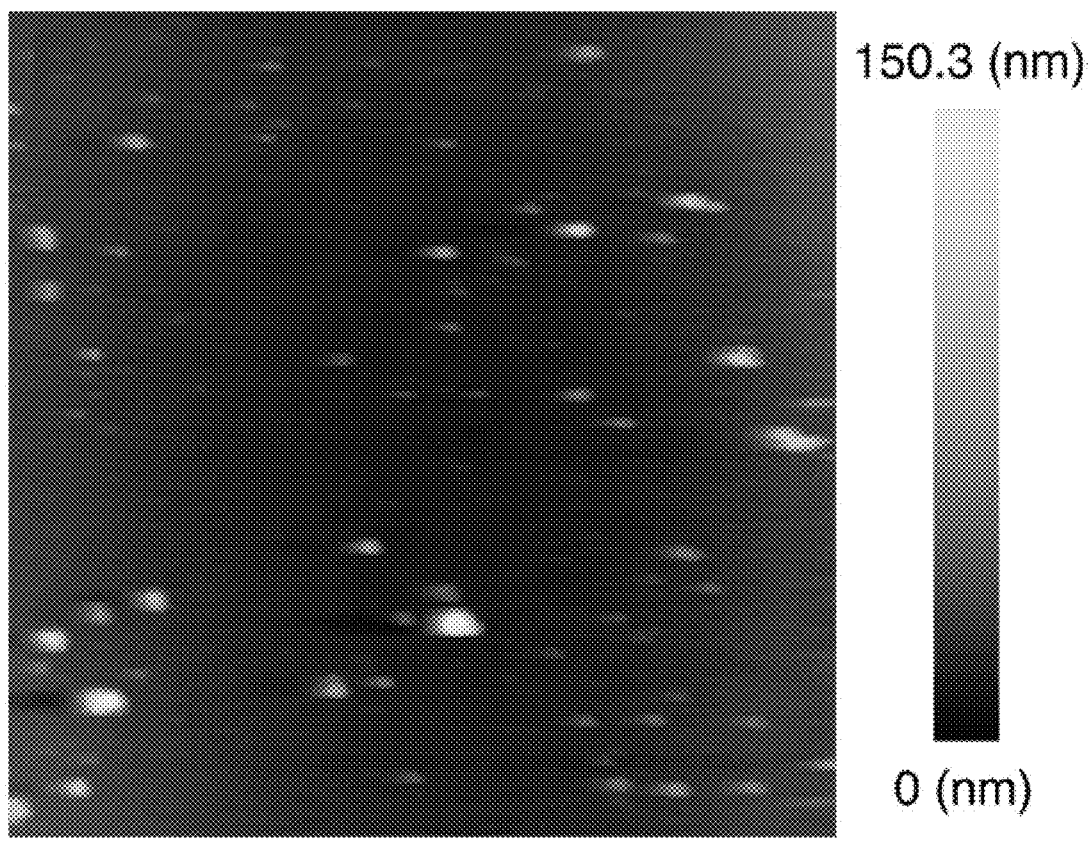
FIG. 10B shows an AFM image of a 20 µm×20 µm primary silver layer coated on glass substrates, consistent with one or more exemplary embodiments of the present disclosure.

The glass substrate coated with silver nanoparticles may then be washed with deionized water to remove loosely bonded silver nanoparticles from the surface. Referring to step 404, three milliliters of glucose solution with a concentration of 9% w/v may be added to each chamber containing a silver deposition solution. Glucose may serve as a reducing agent when added to the deposition solution. Meanwhile the PTFE block oscillates horizontally to help mix the glucose with the deposition solution. After the appearance of a pale-yellow color which is due to the generation of silver nanoparticles in the solution, the glass substrate coated with silver nanoparticles is placed in the chamber immediately. After 5-10 seconds, the color of the glass substrate turns black, which shows the formation of a thin silver film, and then a mirror-like surface is obtained after 20-30 seconds, which may present the formation of a thicker film of silver, but the adhesion of silver layer to the glass is weak and the layer can be detached from the glass easily. FIG. 10A shows an AFM image of a 4 μm×4 μm primary silver layer coated on glass substrates, consistent with one or more exemplary embodiments of the present disclosure. FIG. 10B shows an AFM image of a 20 μm×20 μm primary silver layer coated on glass substrates, consistent with one or more exemplary embodiments of the present disclosure. Referring to the atomic force microscopy (AFM) images shown in FIGS. 9A and 9B, numerous small silver nanoparticles and pinholes are visible on the surface of the glass surface.

The masking capability of the non-porous silver layer prepared in the previous paragraph may be examined by immersing the aforementioned glass substrate in a solution of hydrogen fluoride with a concentration of 66% (w/w). The silver film is delaminated after 10 seconds of immersion in the etching solution.

Referring to step 303, the pattern may be etched on the silver-coated glass substrate to obtain a patterned silver coating. To this end, a silver etchant may be used to etch the silver coating in undesired points. In this example silver is etched by an $[Fe(CN)_6]^{3-}/[Fe(CN)_6]^{2-}$ etching solution. The silver etching solution may be prepared by adding 2 Moles of sodium hydroxide, 1 Mole of sodium thiosulfate, 0.1 Mole of potassium ferricyanide, and 0.01 Mole of potassium ferrocyanide to water. The etching solution is prepared by dissolving appropriate amounts of the above-mentioned reagents in water by the above-stated order under vigorous mixing. Holes may be made on the surface of the silver-coated glass surface, to provide an exemplar pattern on the silver-coated glass substrate. To this end, 1 microliter of the silver etching solution is placed on the surface of the silver-coated glass substrate by a single channel mechanical pipette to create a hole on the silver film. The silver layer under the etchant droplet is etched from the surface after 1 minute and a hole is created in the silver coating. The glass is then washed by deionized water and dried using an inert gas. The procedure of drop casting on one spot has to be performed for several (usually 3) times to etch the silver coating under the spot completely. Finally, the pattern may be designed on the surface by creating several holes on the silver layer.

Figure 11:
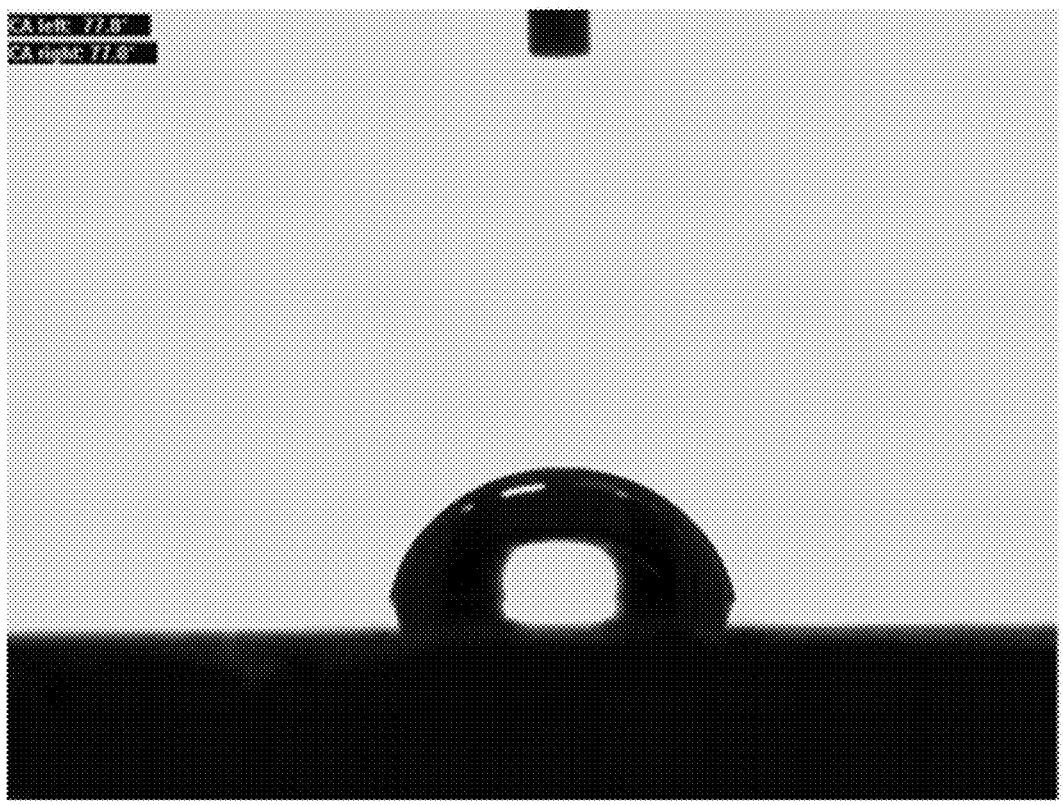
FIG. 11 shows an image presenting the water contact angle (WCA) analysis for a glass substrate coated with a silver-coating, with 10 microliters of deionized water, consistent with one or more exemplary embodiments of the present disclosure.

FIG. 11 shows an image presenting the water contact angle (WCA) analysis for a glass substrate coated with a silver-coating, wetted with 10 microliters of deionized water, consistent with one or more exemplary embodiments of the present disclosure. As shown in FIG. 11, an aqueous etchant can easily wet the silver layer and penetrate through the film and reach the glass substrate via open spaces (pinholes or cracks) formed on the silver film prior to or during the etching step.

Figure 12:
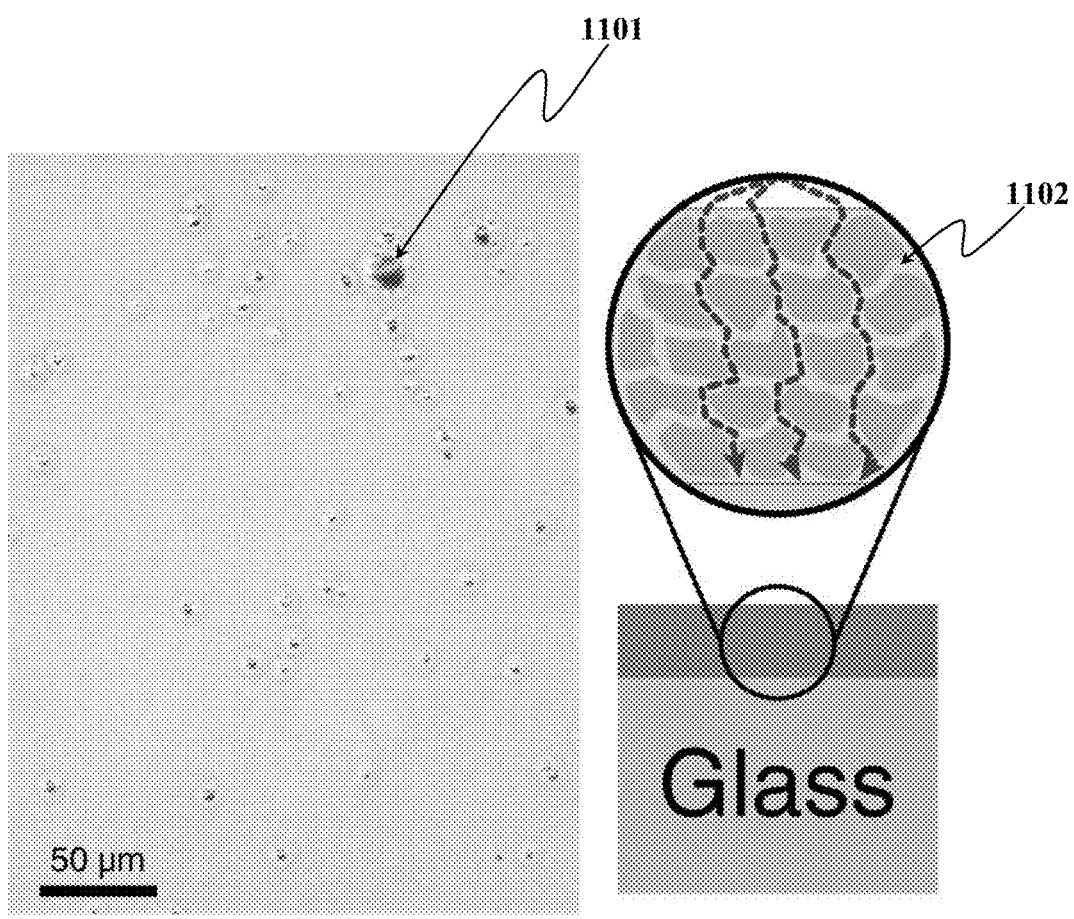
FIG. 12 shows a differential interference contrast (DIC) image and schematic image of a glass substrate coated with a silver coating on which hydrogen fluoride is applied, consistent with one or more exemplary embodiments of the present disclosure.

FIG. 12 shows a schematic image of a glass substrate coated with a single-layer of silver coating on which hydrogen fluoride is applied, consistent with one or more exemplary embodiments of the present disclosure. Referring to FIG. 12, the creation of numerous pinholes 1101 around the patterned holes is due to the weak adhesion of the primary silver layer to the glass substrate which may serve as undesirable pathways for hydrogen fluoride if a single-layer of silver coating is used as a masking layer. Hydrogen fluoride may pass through the pinholes and cracks 1102 provided on a single-layer of silver coating, and reach the glass surface and etch the glass surface in places which are not required to be etched.

Figure 13:
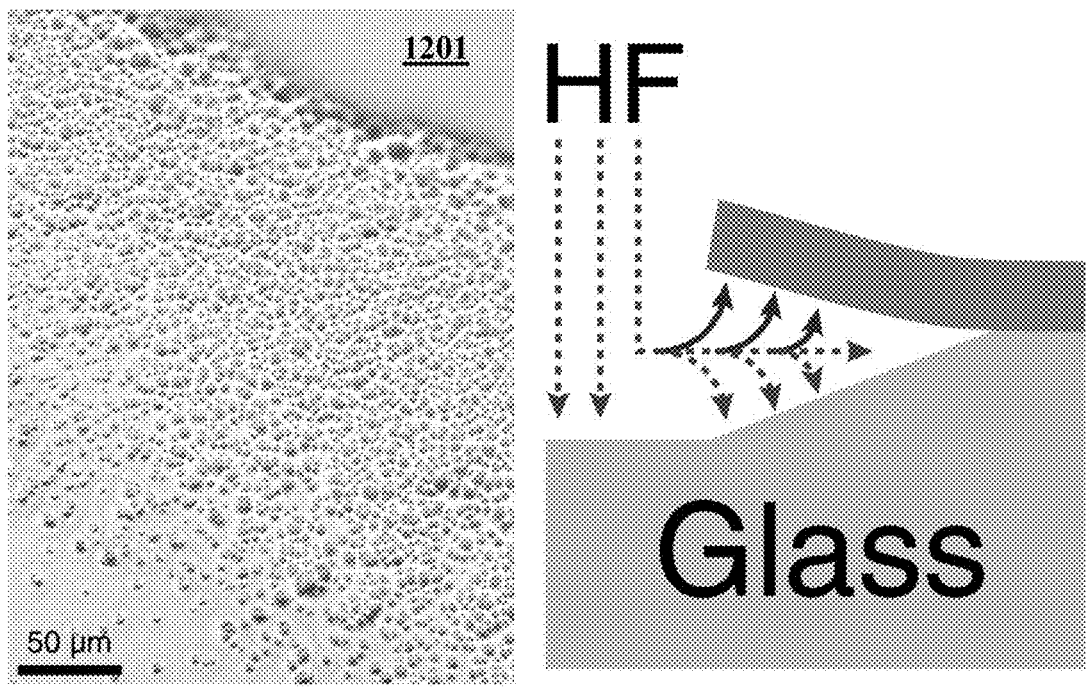
FIG. 13 shows a differential interference contrast (DIC) image and schematic image of a glass substrate coated with a silver coating on which hydrogen fluoride is applied on the edge of a pattern, consistent with one or more exemplary embodiments of the present disclosure.

FIG. 13 shows the images of a glass substrate coated with a single-layer of silver coating on which hydrogen fluoride is applied on the edge of the pattern, consistent with one or more exemplary embodiments of the present disclosure. Referring to FIG. 13, due to the weak adhesion of the silver coating to the glass substrate, by applying hydrogen fluoride on the edge of the single-layer silver pattern, hydrogen fluoride may invade between the silver coating and the glass substrate, pushing the silver coating upwards, and etching the surface of the glass surface, where etching is not desired. As shown in FIG. 13, parts of the glass substrate 1201 which were not coated with the silver coating, were completely etched.

Figure 14:
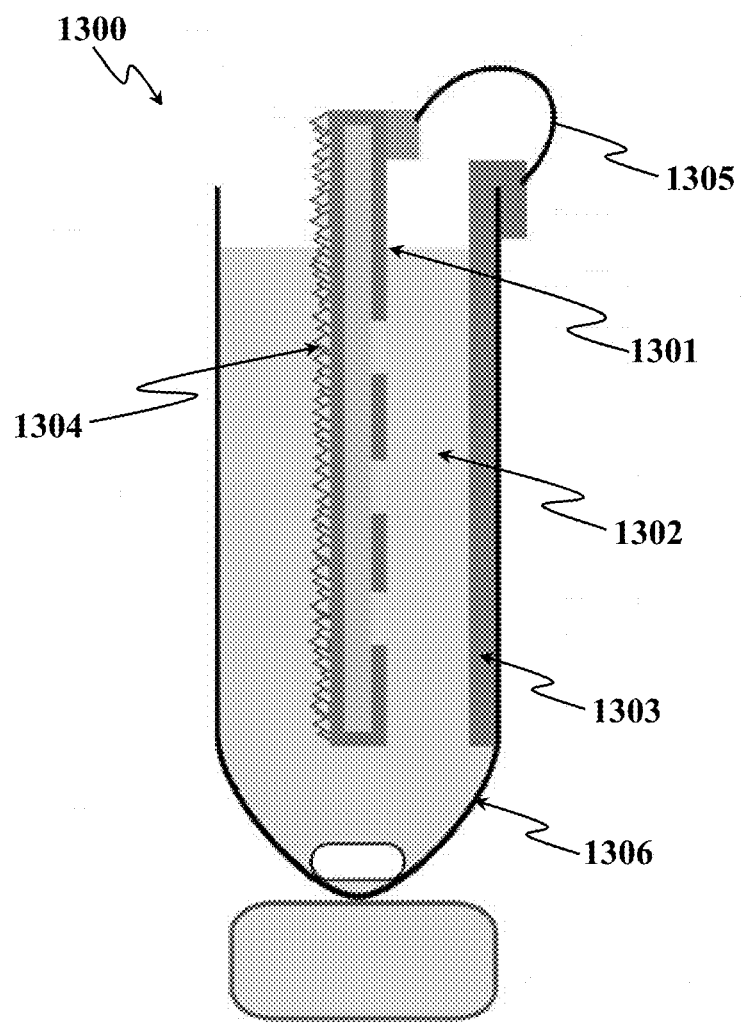
FIG. 14 illustrates an exemplar setup which may be used for the growth of vertically aligned silver nanoplates on the primary silver film, consistent with one or more exemplary embodiments of the present disclosure.

Referring to step 304, vertically aligned silver nanoplates may be grown on the primary silver film to prepare a porous surface. In this process, small pores with high interconnectivity are fabricated, which prevent front broadening of the filling liquid. Moreover, a difference between the residual stress prior and after the growth of vertically aligned silver nanoplates is developed. In an exemplary embodiment, galvanic displacement method may be used to grow vertically aligned silver nanoplates on the silver-patterned glass substrate. FIG. 14 illustrates an exemplar galvanic displacement setup 1300, which may be used for the growth of vertically aligned silver nanoplates on the primary silver film, consistent with one or more exemplary embodiments of the present disclosure. Referring to the setup 1300, a galvanic displacement reaction is conducted with copper as the anode 1303, and the silver-patterned glass substrate as the cathode 1301, inside a 50-milliliter centrifuge tube. In this process, the galvanic displacement solution may include citric acid and silver nitrate as the facet-selective capping agent and the silver source respectively 1303. To this end, a small piece of an adhesive conductive copper tape may be applied to the surface at the end of the silver-patterned glass substrate 1301 to serve as an electrical connection. To prevent the backside of the silver-patterned glass substrate 1301 from being etched by hydrogen fluoride in the etching step, the backside of the silver-patterned glass substrate 1301 may be coated with a Parafilm M® coating 1304. To this end, a piece of Parafilm M® (10×5 cm$^2$) may be placed on the backside of the silver-patterned glass substrate and heated. The heated Parafilm M® adheres strongly on the surface of the silver and protects the backside of the silver-patterned glass substrate from etching. Commercially available copper sheets (10×1 cm$^2$) with a thickness of 50 micrometers may be used as the copper cathode 1303, in the galvanic displacement setup 1300. To this end, the copper sheets may be cleaned by a cloth soaked in a solution of $HNO_3$ with a concentration of 60% (w/w) and deionized water with a ratio of 1:3 (v/v). The cleaned copper sheets may then be washed with deionized water, and dried with an inert gas. An exemplar galvanic displacement solution 1302, may be fabricated by dissolving 3.2 grams of citric acid and 0.1 gram of silver nitrate in 50 milliliters of deionized water. The galvanic displacement solution 1302 is transferred into a vertically aligned 50 milliliters centrifuge tube which may be used as the galvanic displacement chamber 1306. To perform the galvanic displacement process, the conductive copper tape attached to the end of the silver-patterned glass substrate 1301 may be connected to the copper sheet 1303 with a wire 1305. The connected silver-patterned glass substrate and copper sheet are immersed into the galvanic displacement chamber 1306 keeping the connections out of the galvanic displacement solution 1302. The copper sheet 1303 may be dissolved during the galvanic displacement process and silver ions may be reduced on the silver-patterned glass substrate 1301, in the form of silver nanoplates. After one hour, the silver-patterned glass substrate is removed from the growth solution, washed thoroughly with deionized water to remove the loosely bonded materials and dried with an inert gas. The growth procedure should be repeated for a second time using a new growth solution and a new copper sheet to increase the density and roughness of the grown nanoplates.

Figure 15:
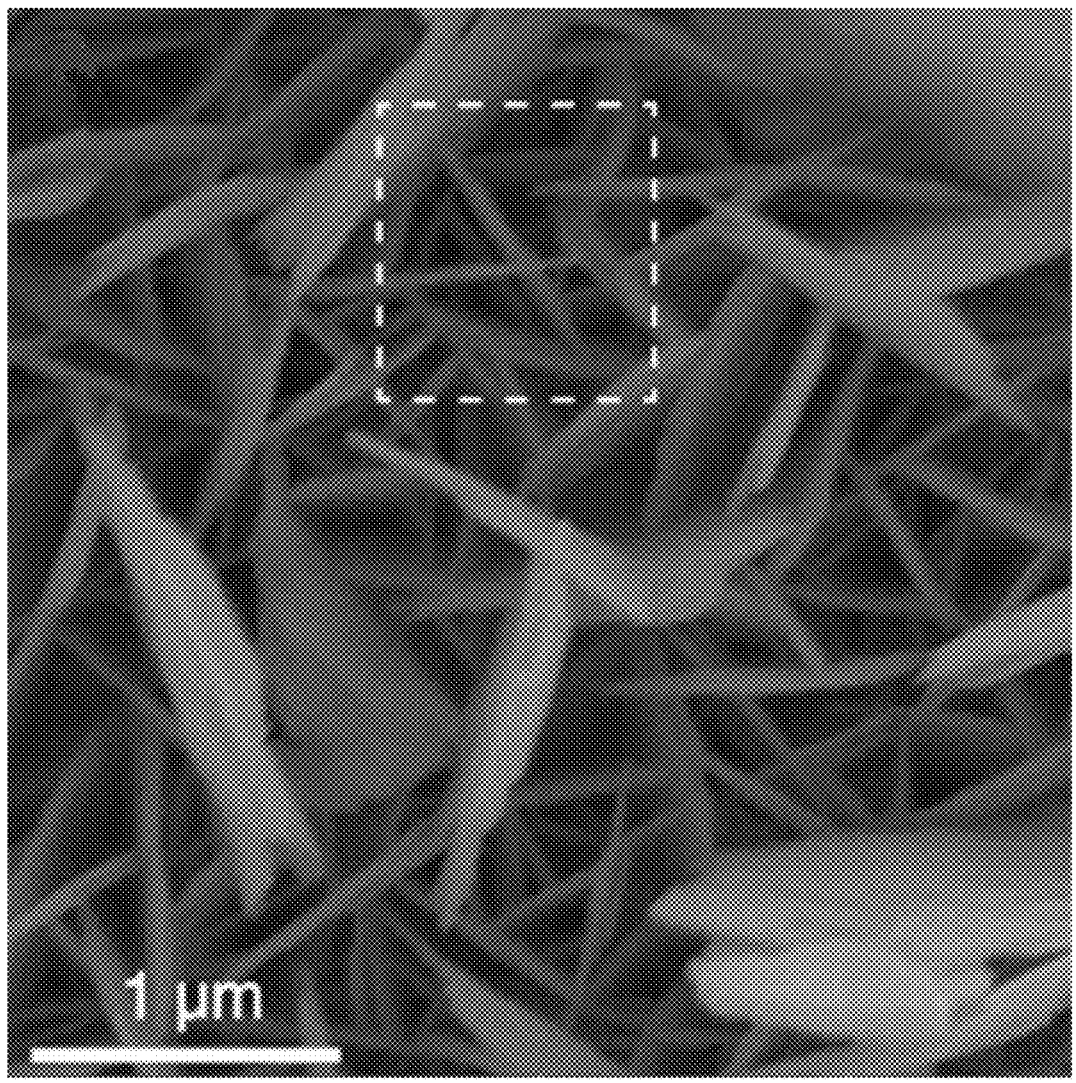
FIG. 15 shows an SEM image of the vertically aligned silver nanoplates grown over a silver-patterned glass substrate, consistent with one or more exemplary embodiments of the present disclosure.

FIG. 15 shows an SEM image of the vertically aligned silver nanoplates grown over a silver-patterned glass substrate, consistent with one or more exemplary embodiments of the present disclosure. Referring to FIG. 15, vertical growth of thin nanoplates may have benefits such as denser nanoplates in unit area which may result in higher porosity.

Figure 16:
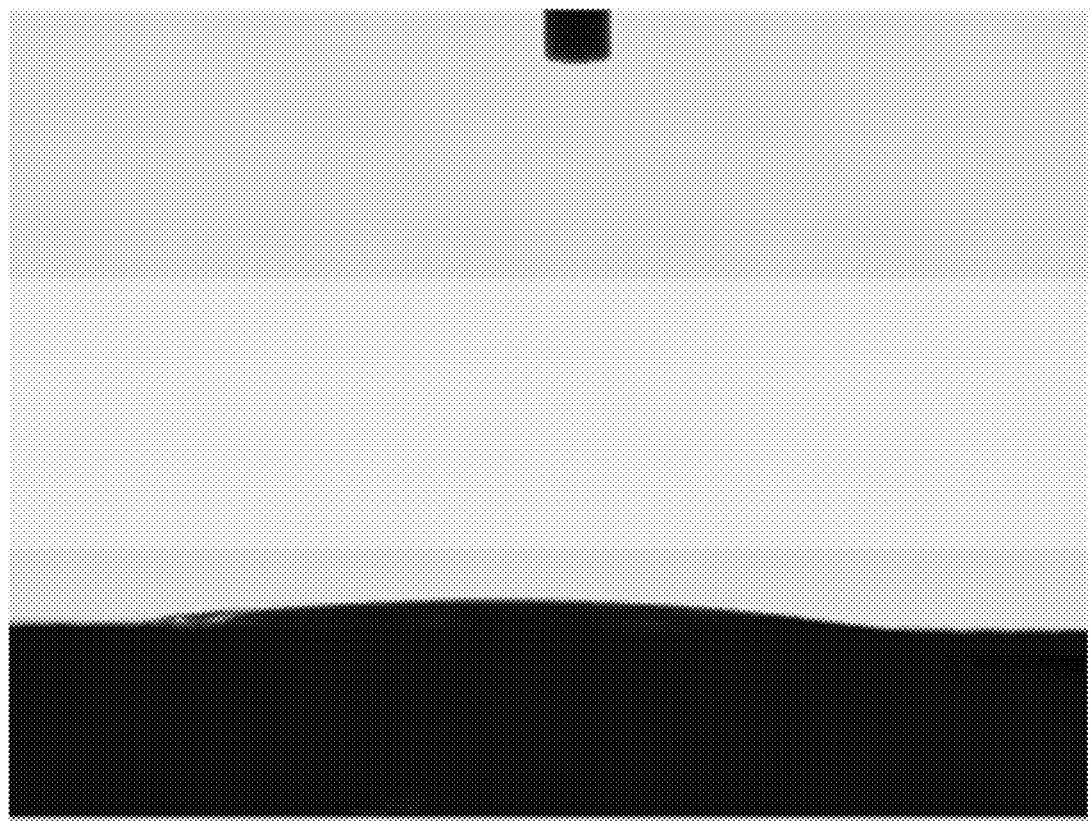
FIG. 16 shows an image presenting the water contact angle (WCA) analysis for an exemplar porous silver surface, consistent with one or more exemplary embodiments of the present disclosure.

FIG. 16 shows an image presenting the water contact angle (WCA) analysis for an exemplar porous silver surface, consistent with one or more exemplary embodiments of the present disclosure. As shown in FIG. 16, the water contact angel (WCA) of the silver coated glass substrate is reduced considerably after two-steps of consecutive growth of silver nanoplates resulting in a superhydrophilic porous silver surface at the end of the second cycle.

The as-prepared superhydrophilic porous silver surface absorbs hydrophobic olive oil as the filling, via capillarity. But capillarity is not enough to retain olive oil stably inside the porous matrix during the wet etching process of glass until complete etching of the glass substrate. In fact, hydrogen fluoride gradually, replaces the olive oil inside the porous silver surface and reduces the volume of olive oil encapsulated inside the masking layer throughout the wet etching process. Referring to step 305, to overcome this issue, the porous silver surface may be coated with a hydrophobic material such as stearic acid to create better adhesion between olive oil and the hydrophobic porous silver surface. In this manner, olive oil remains in the porous silver surface for a longer time which is enough for completing the etching process.

Figure 17:
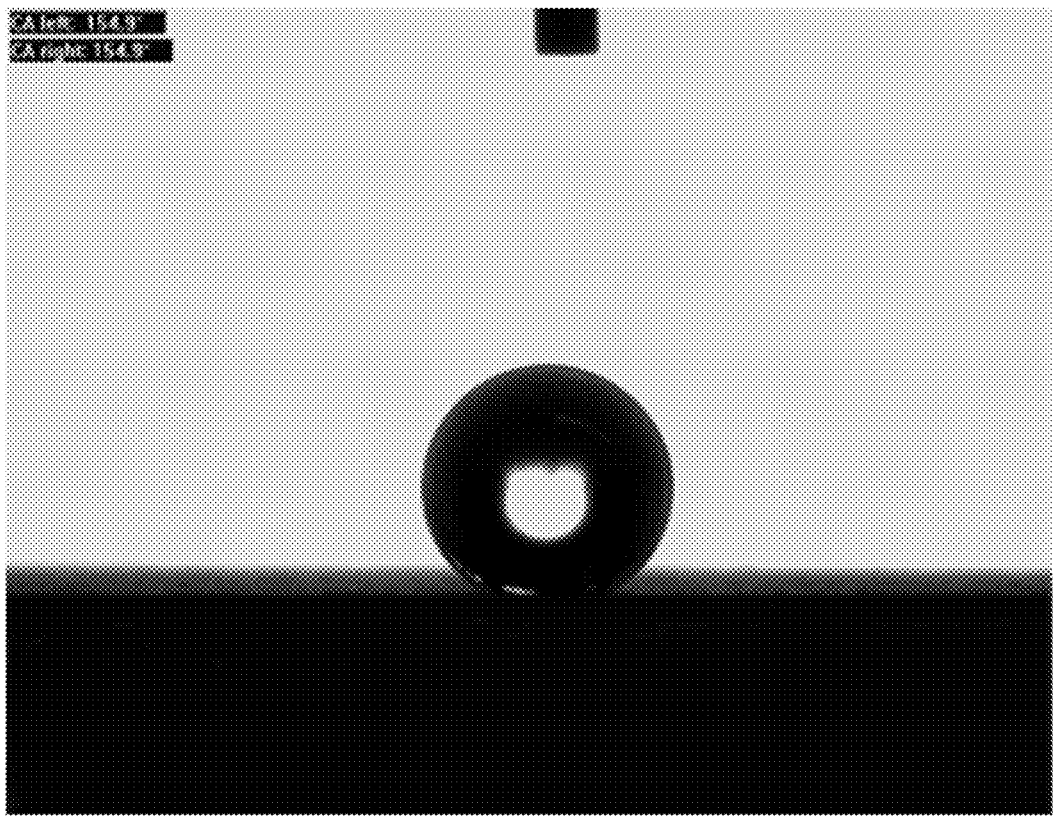
FIG. 17 shows an image presenting the water contact angle (WCA) for an exemplar porous silver surface after applying stearic acid, consistent with one or more exemplary embodiments of the present disclosure.

In an exemplary embodiment, to coat the porous silver surface with stearic acid, first a solution of stearic acid with a concentration of 1% (w/v) in isopropyl alcohol is prepared. Next, a glass substrate covered with vertically aligned silver nanoplates is immersed in the stearic acid solution for 2 hours. The glass substrate is then placed vertically in absolute ethanol for 10 seconds and then dried with an inert gas. FIG. 17 shows an image presenting the water contact angle (WCA) for an exemplar porous silver surface after applying stearic acid, consistent with one or more exemplary embodiments of the present disclosure. Referring to FIG. 17, by adding stearic acid to the nanoporous silver surface, a superhydrophobic surface is obtained, on which the water contact angle increases significantly compared to FIG. 16.

Figure 18:
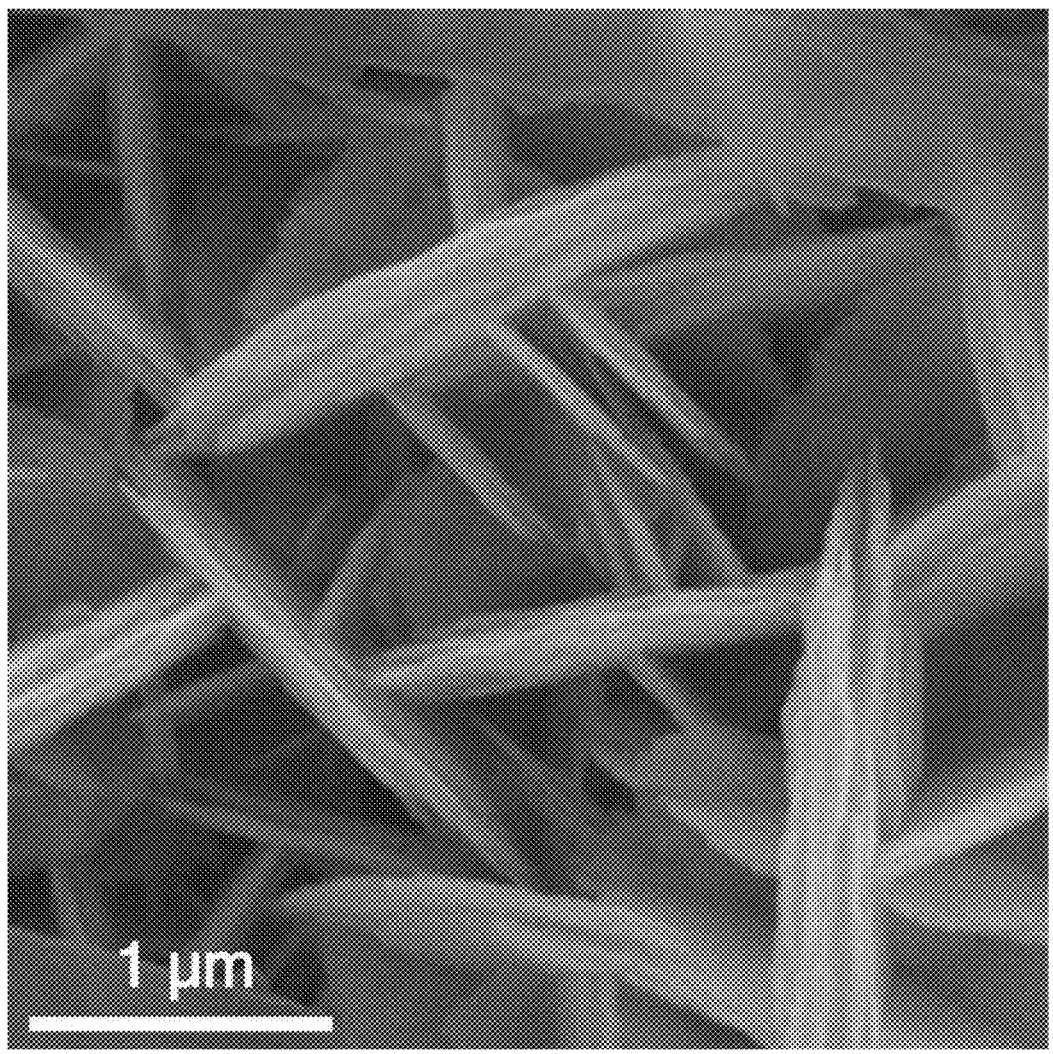
FIG. 18 illustrates an SEM image of silver nanoplates coated with stearic acid, consistent with one or more exemplary embodiments of the present disclosure.

FIG. 18 illustrates an SEM image of exemplar silver nanoplates after applying stearic acid, consistent with one or more exemplary embodiments of the present disclosure. Referring to FIG. 18 it can be seen that the thickness of individual nanoplates increases by adding stearic acid, which may result in better adhesion between the olive oil and the hydrophobic nanoporous silver surface. In general, chemical matching between the porous matrix and filling liquid is essential if the substrate need to be immersed in the etching solution for a long time. In other words, creation of stronger adhesions between the porous matrix and filling liquid is favorable but not necessary specially if the substrate is very thin (in the range of nanometers) and the etching rate of the etchant is high. In this situation, loss of filling liquid during the etching procedure may be negligible, due to the short etching time.

Theoretical investigations predict that the impregnation of a liquid into a rough surface, increases with the increase of surface roughness. So, 3D porous structures produce higher capillarity compared to 2D porous structures and provide higher affinity for the absorption and infiltration of a liquid. On this basis, the capillary action becomes zero for the smooth surface. Therefore, the smooth surfaces of the masking layer which is not coated is not covered by the filling liquid. Referring to step 306, olive oil may be chosen as the filling liquid, because olive oil is a cheap natural material which is inert to hydrogen fluoride. To this end, the glass substrate covered by superhydrophobic silver surface is placed in a petri dish containing olive oil. Olive oil penetrates into the pores of the superhydrophobic silver surface due to the capillary property within several hours. The pores are completely filled with olive oil and the produced masking layer is completely slippery, which indicates that the porous superhydrophobic silver surface is completely filled with olive oil and a thin layer of olive oil has covered the porous surface.

Figure 19A:
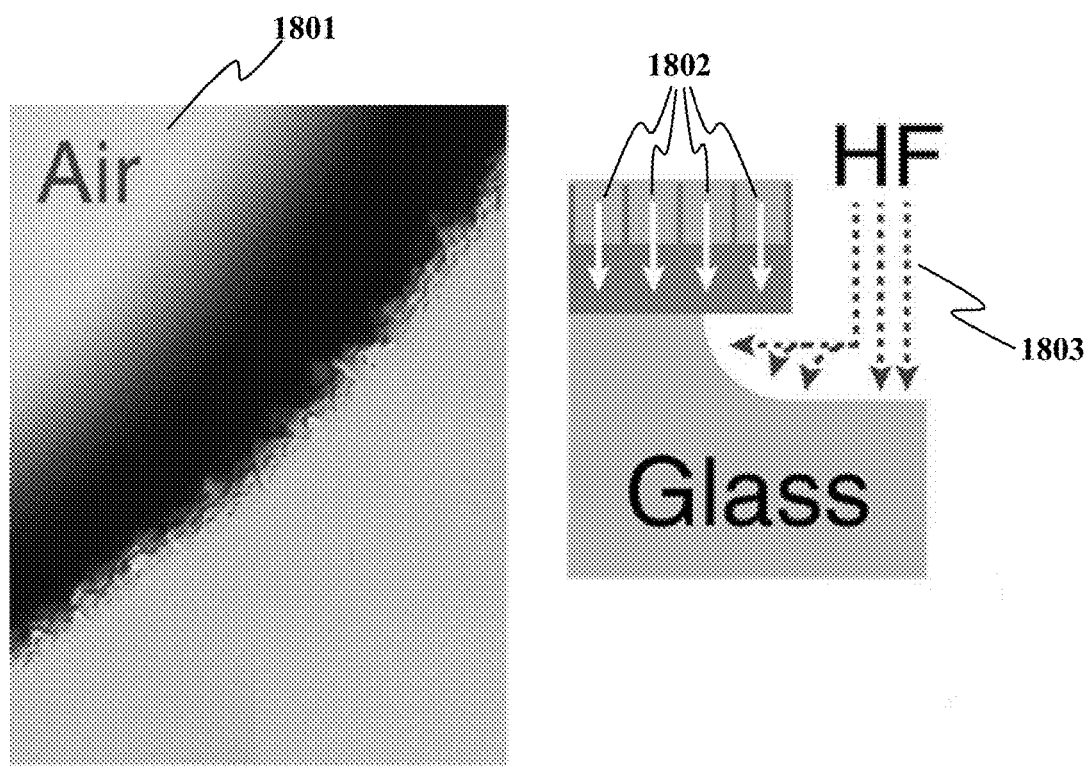
FIG. 19A illustrates a differential interference contrast (DIC) image of the edge of a pattern on a glass substrate covered with a liquid-based masking layer after etching by hydrogen fluoride with a concentration of 66% (w/w) for 4 minutes, consistent with one or more exemplary embodiments of the present disclosure.

The nanoporous silver surface has been configured to firmly hold the filling liquid which is the main masking element, as close as possible to the surface of the substrate. Otherwise, the filling liquid may be washed away by the etching liquid during the wet etching process. In other words, the filling liquid must fill the porosities of the porous surface and it must, indispensably, cover the bottom of the porous matrix which are the nearest pores to the surface of the substrate. Upper portions may or may not be filled by the filling liquid but the filling liquid has to be the closest liquid layer to the surface of the substrate. The essential requirement for the as-prepared liquid-based masking layer is the existence of a continuous and flawless layer of infiltrated liquid adjacent to the surface of the substrate and inside the porous surface during the whole wet etching procedure. To test the as-prepared liquid-based masking layer, wet etching is performed on the glass substrates masked by the as-prepared liquid-based masking layer. The as-prepared oil-filled superhydrophobic porous silver film resists against a hydrofluoric acid solution with a concentration of (66%) without decline in protection property. The patterned holes are etched completely during 2-3 minutes but the glass substrate is usually kept in the etching solution for 4 minutes. FIG. 19A illustrates a differential interference contrast (DIC) image of the edge of a pattern on a glass substrate covered with a liquid-based masking layer after etching by a hydrogen fluoride solution with a concentration of 66% (w/w) for 4 minutes. Referring to FIG. 19A, the glass substrate was completely etched in unmasked areas 1801. The compressive stress 1802, which is provided in the nanoporous silver surface due to the existence of the filling oil, improved the adhesion of the masking layer to the glass substrate which further inhibited the delamination of the nanoporous silver surface. Moreover, olive oil completely prevented the etchant 1803 to enter the masking layer.

Figure 19B:
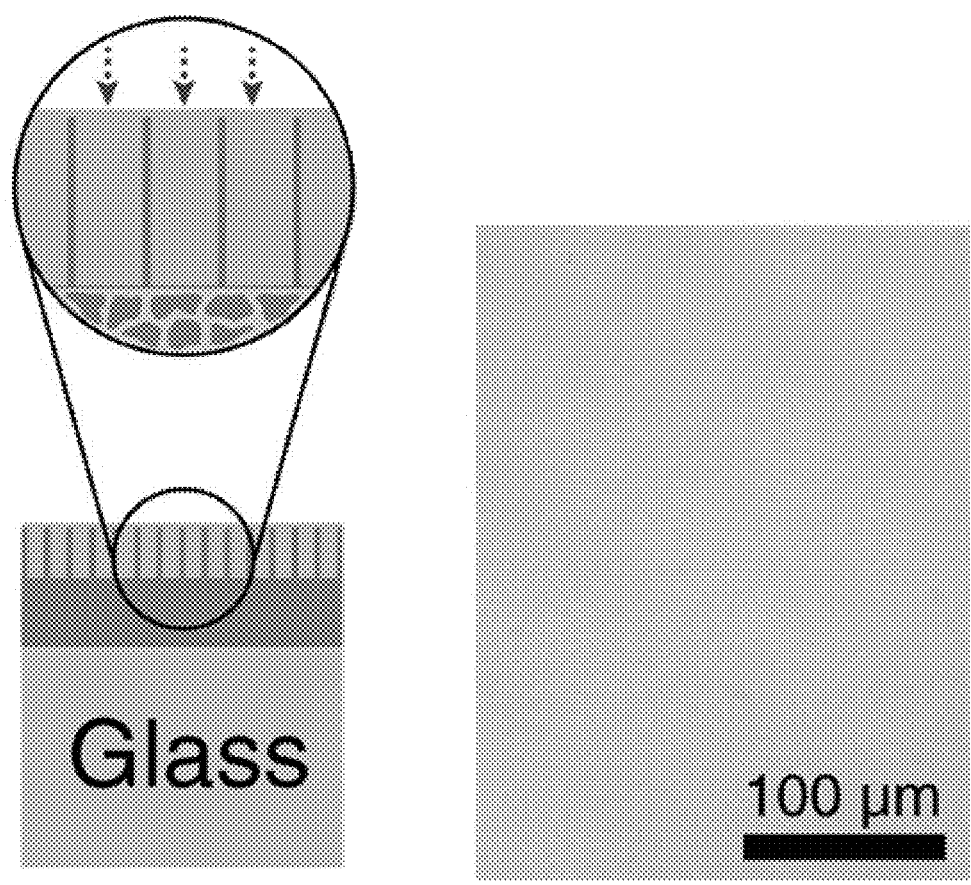
FIG. 19B shows a differential interference contrast (DIC) image and schematic image of a glass substrate coated with a silver coating on which hydrogen fluoride is applied, consistent with one or more exemplary embodiments of the present disclosure.

FIG. 19B shows a differential interference contrast (DIC) image and schematic image of a glass substrate coated with a silver coating on which hydrogen fluoride is applied, consistent with one or more exemplary embodiments of the present disclosure. Referring to FIG. 19B, the edges of the holes are smooth and no pinholes are observed on the glass representing the efficiency of the as-prepared masking layer for wet etching in a harsh medium.

Silver as a type II metal possesses compressive tensile and compressive stress behavior while being coated. Silver shows compressive stress in the deposition process and after the percolation thickness, but the compressive stress evolves towards the tensile stress by interruption in coating. The observed reversibility in stresses is related to the adatoms which enter the grain boundaries during the deposition and when coating is interrupted. The observed fact supports the idea of controlling the stress by the presence of adatoms in the grain boundaries. Liquid can behave like adatoms if entering a porous structure by capillary action and remaining enclosed therein. Infusion of olive oil as a viscous fluid in the proposed superhydrophobic silver film provides compressive stress necessary for better adhesion of the masking layer to the glass substrate. The filling oil prohibits the entrance of the etchant to the holes or cracks due to the immiscibility of olive oil with the hydrogen fluoride solution.

Example 2

For purposes of clarity, another example is provided in which a liquid-based masking layer is fabricated pursuant to the teachings of the present disclosure. However, it should be understood that in other embodiments, one or more of the steps disclosed herein can be omitted as desired, or additional steps may be included.

In an exemplary embodiment of the present disclosure, colloidal crystals may be used as the porous surface for the proposed liquid-based masking layers. Colloidal assemblies may be prepared on the entire substrate and then be patterned, similar to the previous example; but there are also straightforward techniques to create patterned colloidal assemblies.

Figure 20A:
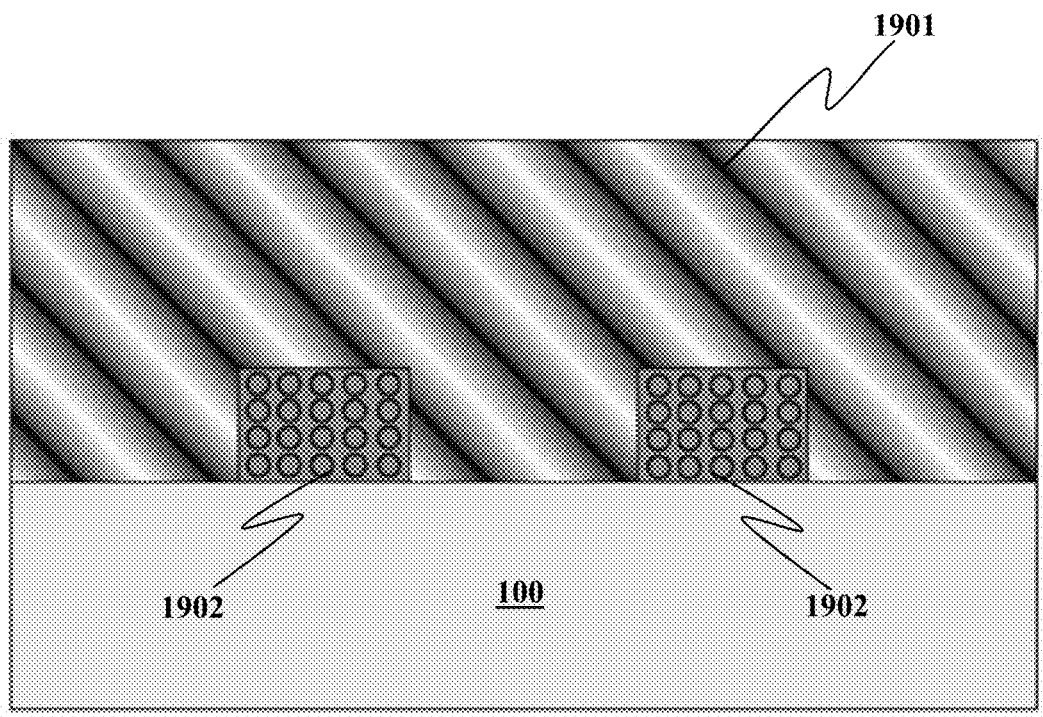
FIG. 20A shows a schematic image of a method of fabricating colloidal assemblies on a substrate using a microfluidic chip as a template, consistent with one or more exemplary embodiments of the present disclosure, while the microfluidic chip is placed on the solid substrate.
Figure 20B:
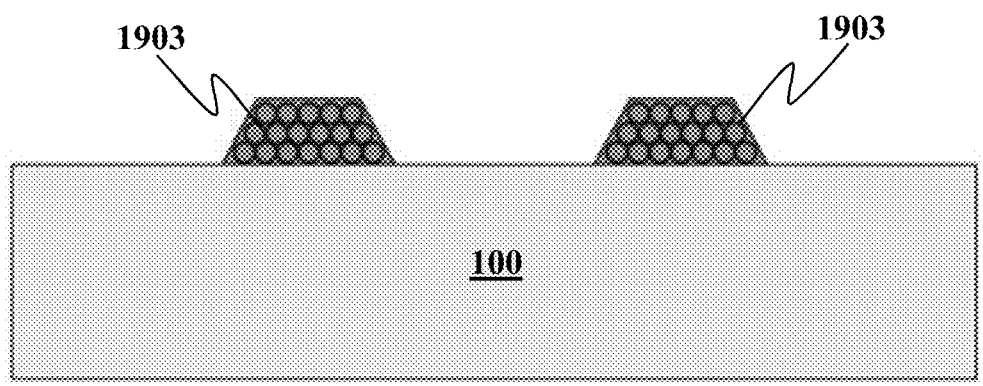
FIG. 20B shows a schematic image of a method of fabricating colloidal assemblies on a substrate using a microfluidic chip as a template, consistent with one or more exemplary embodiments of the present disclosure, while the injection is done and the nozzle is removed from the surface.

In an exemplary embodiment, templates such as microfluidic chips may be used to deposit micro/nanoparticles on a substrate. FIG. 20A shows a schematic image of a method of fabricating colloidal assemblies on a substrate using a microfluidic chip as a template, consistent with one or more exemplary embodiments of the present disclosure, while the microfluidic chip is placed on the solid substrate, and FIG. 20B shows a schematic image of a method of fabricating colloidal assemblies on a substrate using a microfluidic chip as a template, consistent with one or more exemplary embodiments of the present disclosure, while the injection is done and the nozzle is removed from the surface. Referring to FIGS. 19A and 19B, a microfluidic chip is a set of micro-channels etched or molded into a material such as glass, silicon or a polymer. Patterns may also be etched or molded on microfluidic chips. It is through these micro-channels that liquids or gases are injected and removed from the microfluidic chip. Referring to FIG. 20, a pattern may first be molded or etched on a microfluidic chip. Then, the microfluidic chip may be placed on the glass substrate and a carrier liquid may be injected into the micro-channels. The carrier liquid, carries particles to the specific location on the substrate where the particles have to be gathered and fills the patterns on the microfluidic chip, to produce colloidal assemblies. The carrier liquid may then be dried or evaporated to form dry colloidal crystals on the substrate which may serve as a patterned porous surface. Then the microfluidic chip may be removed, and a patterned porous surface is formed on the glass surface. Filling the patterned porous surface with a filling liquid which is inert and immiscible to the substrate etchant may provide a liquid-based masking layer on the glass substrate.

Figure 21A:
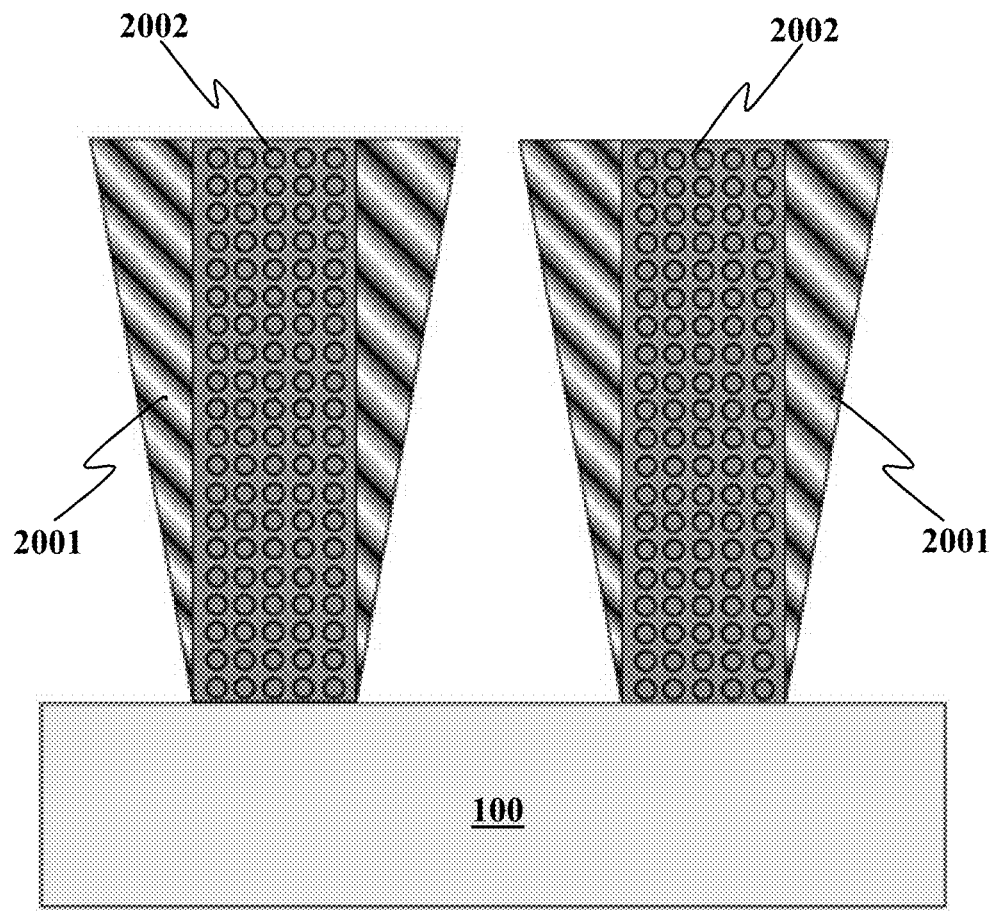
FIG. 21A shows a schematic image of a method of fabricating colloidal assemblies on a substrate using a nozzle injecting a carrier liquid on a glass substrate, consistent with one or more exemplary embodiments of the present disclosure, while the nozzle is placed on the solid substrate.
Figure 21B:
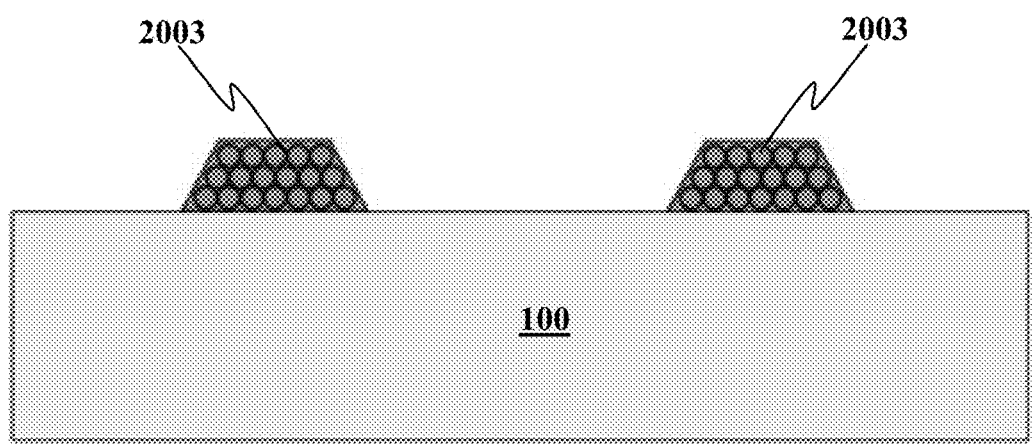
FIG. 21B shows a schematic image of a method of fabricating colloidal assemblies on a substrate using a nozzle injecting a carrier liquid on a glass substrate, consistent with one or more exemplary embodiments of the present disclosure, while the injection is done and the nozzle is removed from the surface.

In an exemplary embodiment of the present disclosure, a nozzle may be used to inject a carrier liquid with a pattern on a glass substrate. FIG. 21A shows a schematic image of a method of fabricating colloidal assemblies on a substrate using a nozzle injecting a carrier liquid on a glass substrate, consistent with one or more exemplary embodiments of the present disclosure, while the nozzle is placed on the solid substrate. FIG. 21B shows a schematic image of a method of fabricating colloidal assemblies on a substrate using a nozzle injecting a carrier liquid on a glass substrate, consistent with one or more exemplary embodiments of the present disclosure, while the injection is done and the nozzle is removed from the surface. Referring to FIGS. 20A and 20B, the carrier liquid may be injected through the nozzle by moving the nozzle on the surface. The carrier liquid may then be dried or evaporated to form dry colloidal crystals on the substrate, which may serve as a patterned porous surface. Filling the patterned porous surface with a filling liquid which is inert and immiscible to the substrate etchant may provide a liquid-based masking layer on the glass substrate.

Figure 22A:
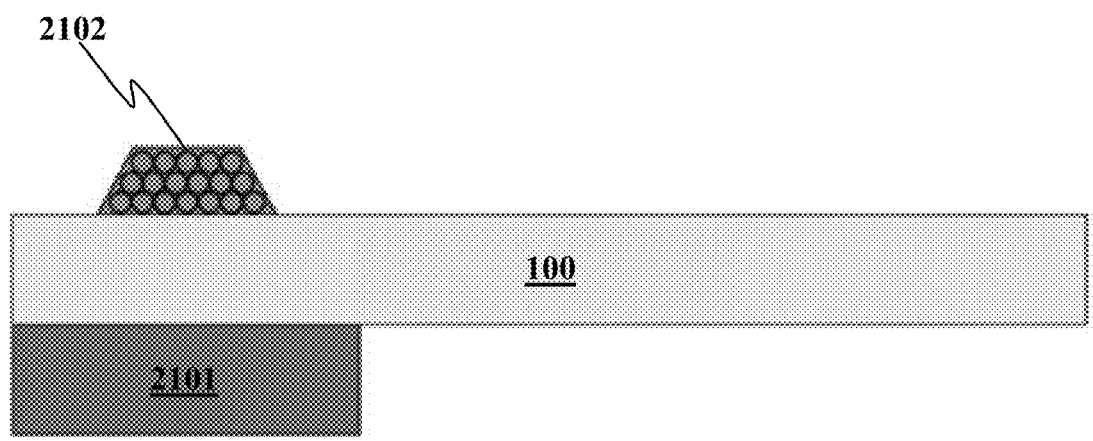
FIG. 22A shows a schematic image of the method, using particles with magnetic properties, consistent with one or more exemplary embodiments of the present disclosure, in which the magnetic liquid-based masking layer is at a first position.

In an exemplary embodiment, particles with magnetic properties may be chosen as the nanoporous surface. FIG. 22A shows a schematic image of an exemplary method, using particles with magnetic properties, consistent with one or more exemplary embodiments of the present disclosure, in which the magnetic liquid-based masking layer is at a first position.

Figure 22B:
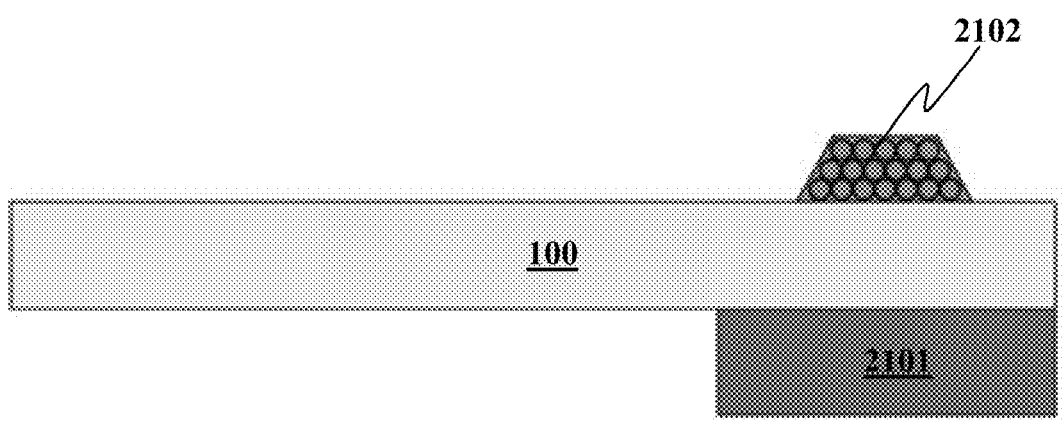
FIG. 22B shows a schematic image of the method, using particles with magnetic properties, consistent with one or more exemplary embodiments of the present disclosure, in which the magnetic liquid-based masking layer is moved to a second position.

FIG. 22B shows a schematic image of an exemplary method, using particles with magnetic properties, consistent with one or more exemplary embodiments of the present disclosure, in which the magnetic liquid-based masking layer is moved to a second position. Referring to FIGS. 21A and 21B, particles with magnetic properties may be easily patterned by external magnetic fields even without a template. On the other hand, particles with magnetic properties may adhere strongly to the substrate due to the magnetic field which may be provided by a magnet on the other side of the substrate. The tendency of particles to move towards the magnet provides a sufficient adhesion force to confine colloidal assembly on the substrate. The magnetic field may be configured to float (or even levitate) a solid portion of the masking layer on the substrate. Thus, the porous solid surface is able to slip and move on the substrate in response to the motion of the magnetic field. Consequently, the filling liquid moves and the whole masking layer may be relocated on the substrate, which may result in a moving masking layer. In this method, a single masking layer may be used for patterning a long substrate, or a sequence of substrates placed one-by-one under the colloidal assembly, which may be referred to as Roll-to-Roll application.

Another capability of the liquid-based masking layer constructed by magnetic particles is easy stripping. Routine solid-phase masking layers have to be removed from the substrate after the wet etching process, which is referred to as the stripping process. In the stripping process, the substrate goes through a dry etching process or is brought into contact with specific (in)organic liquids as etchants of the masking layer. In liquid-based masking layers using particles with magnetic properties, by eliminating the magnetic field either by removing a permanent magnet or turning off a switchable magnet, the adhesion between the colloidal assembly and the substrate is eliminated. Thus, no stripping step is required and a simple washing of the substrate with deionized water is enough for removing colloidal assemblies from the substrate after removing the magnetic field.

As described in examples 1 and 2, colloidal particles and especially colloidal particles with magnetic properties may expand the capabilities of the disclosed liquid-based masking layer. The liquid-based masking layer may be patterned in direct-write method and may be used inside closed spaces. The liquid-based masking layer may be moved on the substrate and reused entirely due to the use of recoverable magnetic particles. In this method, the masking layer may be easily stripped without the use of organic solvents. The magnetic field dictates the pattern of the masking layer on the substrate, therefore, altering the magnetic field on some areas on the surface of the substrate may keep the areas uncovered with colloidal assemblies.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 201, 202, or 203 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments. This is for purposes of streamlining the disclosure, and is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments have been described, the description is intended to be exemplary, rather than limiting and it will be apparent to those of ordinary skill in the art that many more embodiments are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A method of fabricating a liquid-based masking layer for a wet etching process, the method comprising:
   forming a coated solid substrate by coating a solid substrate with a coating;
   forming a preliminary masking layer by removing parts of the coating which are not included in a pattern;
   depositing a porous surface on the preliminary mask to obtain a porous preliminary mask;
   forming a liquid-based masking layer by filling the pores of the porous preliminary mask with a filling liquid; and
   applying an etchant to a surface of the solid substrate and the liquid-based masking layer for etching parts of the substrate that are not covered with the liquid-based masking layer.

2. The method of claim 1, wherein applying the etchant to the surface of the solid substrate comprises applying etchant to a top surface of the solid substrate on which the liquid-based masking layer is formed.

3. The method of claim 1, wherein forming the coated solid substrate by coating a solid substrate with a coating comprises coating all exposed surfaces of the solid substrate with the coating.

4. The method of claim 3, wherein forming a preliminary masking layer by removing parts of the coating which are not included in the pattern, comprises removing parts of the coating not included in the pattern, by drop casting an acid selectively on parts of the coated solid substrate.

5. The method of claim 3, wherein applying an etchant to the solid substrate etching parts of the substrate that are not covered with the liquid-based masking layer comprises applying the etchant by dipping the solid substrate with the liquid-based masking layer into an etchant.

6. The method of claim 1, wherein forming a liquid-based masking layer by filling the pores of the patterned porous surface with a filling liquid further comprises hydrophilizing the patterned porous surface.

7. The method of claim 1, wherein the liquid-based masking layer is resistant to the etchant used for the wet etching process.

8. The method of claim 1, wherein depositing a porous surface on the preliminary mask to obtain a porous preliminary mask; further comprises depositing a porous surface with magnetic properties on the preliminary mask to obtain a magnetic porous preliminary mask.

9. A method of fabricating a liquid-based masking layer used for wet etching process, the method comprising:
   forming a porous preliminary mask on a solid substrate by depositing a porous surface on parts of the solid substrate not included in a pattern;
   forming a liquid-based masking layer by filling the pores of the porous preliminary mask with a filling liquid;
   applying an etchant to a surface of the solid substrate etching parts of the substrate that are not covered with the liquid-based masking layer.

10. The method of claim 9, wherein applying an etchant to the solid substrate comprises applying an etchant to a top surface of the solid substrate on which the liquid-based masking layer is formed.

11. The method of claim 10, wherein applying an etchant to the solid substrate, etching parts of the substrate that are not covered with the liquid-based masking layer comprises, applying the etchant by dipping the solid substrate with the liquid-based masking layer into the etchant.

12. The method of claim 9, wherein forming a liquid-based masking layer by filling the pores of the porous preliminary mask with a filling liquid further comprises hydrophilizing the porous preliminary mask.

13. The method of claim 9, wherein the liquid-based masking layer is resistant to the etchant used for the wet etching process.

14. The method of claim 9, wherein forming a porous preliminary mask on a surface of the solid substrate, further comprises forming a porous preliminary mask using a microfluidic chip.

15. The method of claim 14, wherein forming a porous preliminary mask using a microfluidic chip further comprises:
   forming a patterned microfluidic chip by engraving a pattern on the microfluidic chip;
   placing the microfluidic chip on the solid substrate and filling the pattern engraved on the microfluidic chip with a carrier liquid; and
   forming a porous preliminary mask on the solid substrate by drying the carrier liquid and obtaining a porous surface.

16. The method of claim 9, wherein forming a porous preliminary mask on a surface of the solid substrate, further comprises forming a porous preliminary mask using a nozzle.

17. The method of claim 16, wherein forming a porous preliminary mask using a nozzle further comprises:
   placing the nozzle on the surface of the solid substrate according to a pattern;
   injecting a carrier liquid on the solid substrate; and
   forming a porous preliminary mask on the solid substrate by drying the carrier liquid.

18. The method of claim 9, wherein forming a porous preliminary mask on a solid substrate by depositing a porous surface on the solid substrate, further comprises forming a porous preliminary mask with magnetic properties on a solid substrate by depositing a porous surface on the solid substrate.

* * * * *